US012025058B2

(12) United States Patent
Kinoshita et al.

(10) Patent No.: US 12,025,058 B2
(45) Date of Patent: Jul. 2, 2024

(54) SEALING MEMBER AND GAS TURBINE

(71) Applicant: MITSUBISHI HEAVY INDUSTRIES, LTD., Tokyo (JP)

(72) Inventors: Taiki Kinoshita, Kanagawa (JP); Kenji Sato, Kanagawa (JP); Kentaro Tokuyama, Kanagawa (JP); Kenta Taniguchi, Kanagawa (JP); Hiroyuki Sakaki, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/270,301

(22) PCT Filed: Jan. 27, 2022

(86) PCT No.: PCT/JP2022/002981
§ 371 (c)(1),
(2) Date: Jun. 29, 2023

(87) PCT Pub. No.: WO2022/190689
PCT Pub. Date: Sep. 15, 2022

(65) Prior Publication Data
US 2024/0084736 A1 Mar. 14, 2024

(30) Foreign Application Priority Data
Mar. 9, 2021 (JP) .................................. 2021-037153

(51) Int. Cl.
*F02C 7/28* (2006.01)
*F01D 9/02* (2006.01)
(Continued)

(52) U.S. Cl.
CPC ................ *F02C 7/28* (2013.01); *F01D 9/023* (2013.01); *F01D 11/005* (2013.01); *F01D 25/12* (2013.01);
(Continued)

(58) Field of Classification Search
CPC ...... F02C 7/12; F02C 7/28; F01D 9/02; F01D 9/023; F01D 9/06; F01D 9/065;
(Continued)

(56) References Cited

U.S. PATENT DOCUMENTS 6,751,962 B1   6/2004  Kuwabara et al.
8,353,165 B2 * 1/2013  McMahan ................. F23R 3/60
                                                       431/352

(Continued)

FOREIGN PATENT DOCUMENTS

JP      2000-257862      9/2000
JP      2004-225688      8/2004
(Continued)

OTHER PUBLICATIONS

International Search Report issued Mar. 29, 2022 in International Application No. PCT/JP2022/002981.

*Primary Examiner* — Kyle Robert Thomas
(74) *Attorney, Agent, or Firm* — Wenderoth, Lind & Ponack, L.L.P.

(57) ABSTRACT

A sealing member that forms a combustion gas flow path of a gas turbine includes a first body portion having a cooling passage. The first body portion includes a first end portion forming one end portion in a circumferential direction, a second end portion forming the other end portion on an opposite side in the circumferential direction, and an intermediate portion formed between the first and second end portions. The cooling passage includes an intermediate portion cooling passage inclined at a first angle with respect to an axial direction, a first end portion cooling passage provided in the first end portion and inclined at a second angle with respect to the axial direction, and a second end portion cooling passage provided in the second end portion and inclined at a third angle with respect to the axial
(Continued)

direction, and the second and third angles are smaller than the first angle.

20 Claims, 10 Drawing Sheets

(51) Int. Cl.
  *F01D 11/00* (2006.01)
  *F01D 25/12* (2006.01)
  *F02C 7/12* (2006.01)
  *F23R 3/42* (2006.01)
(52) U.S. Cl.
  CPC .................. *F02C 7/12* (2013.01); *F23R 3/42* (2013.01); *F23R 2900/00012* (2013.01)
(58) Field of Classification Search
  CPC ........ F01D 9/047; F01D 11/005; F01D 25/12; F23R 2900/00012; F05D 2240/35; F05D 2240/55; F05D 2220/3212
  See application file for complete search history.

(56) References Cited

U.S. PATENT DOCUMENTS

| | | |
|---|---|---|
| 8,632,298 B1 | 1/2014 | Liang |
| 10,724,392 B2* | 7/2020 | Taniguchi ............ F16J 15/4476 |
| 2004/0139746 A1 | 7/2004 | Soechting et al. |
| 2007/0059178 A1 | 3/2007 | Shapiro |
| 2014/0000267 A1* | 1/2014 | Melton ................... F01D 9/023 60/752 |
| 2020/0300104 A1 | 9/2020 | Fukui |

FOREIGN PATENT DOCUMENTS

| | | |
|---|---|---|
| JP | 2007-77981 | 3/2007 |
| JP | 2019-78204 | 5/2019 |

* cited by examiner

FIG. 7
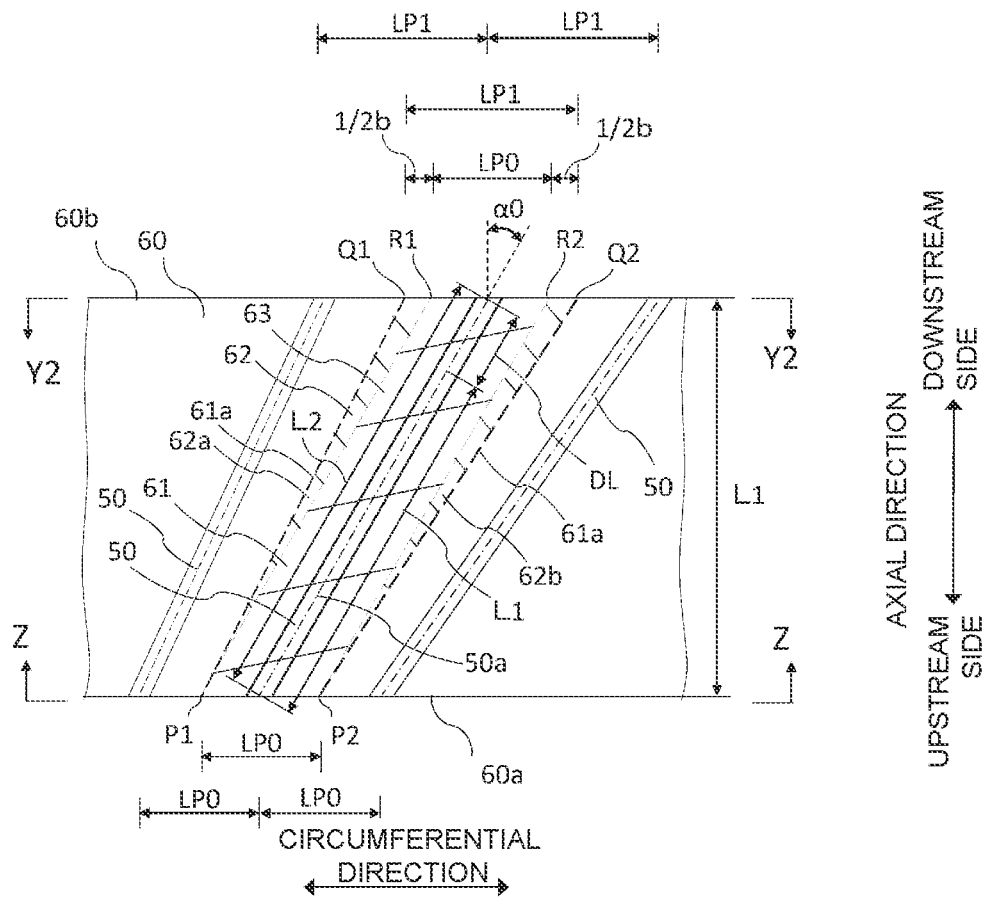
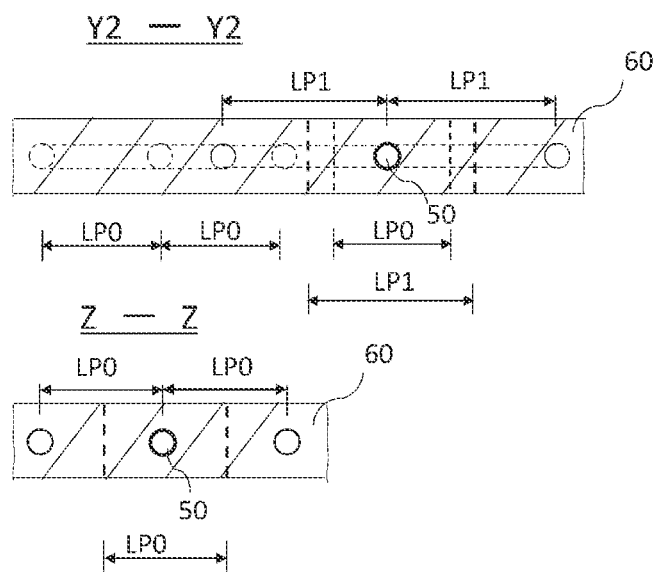

FIG. 10
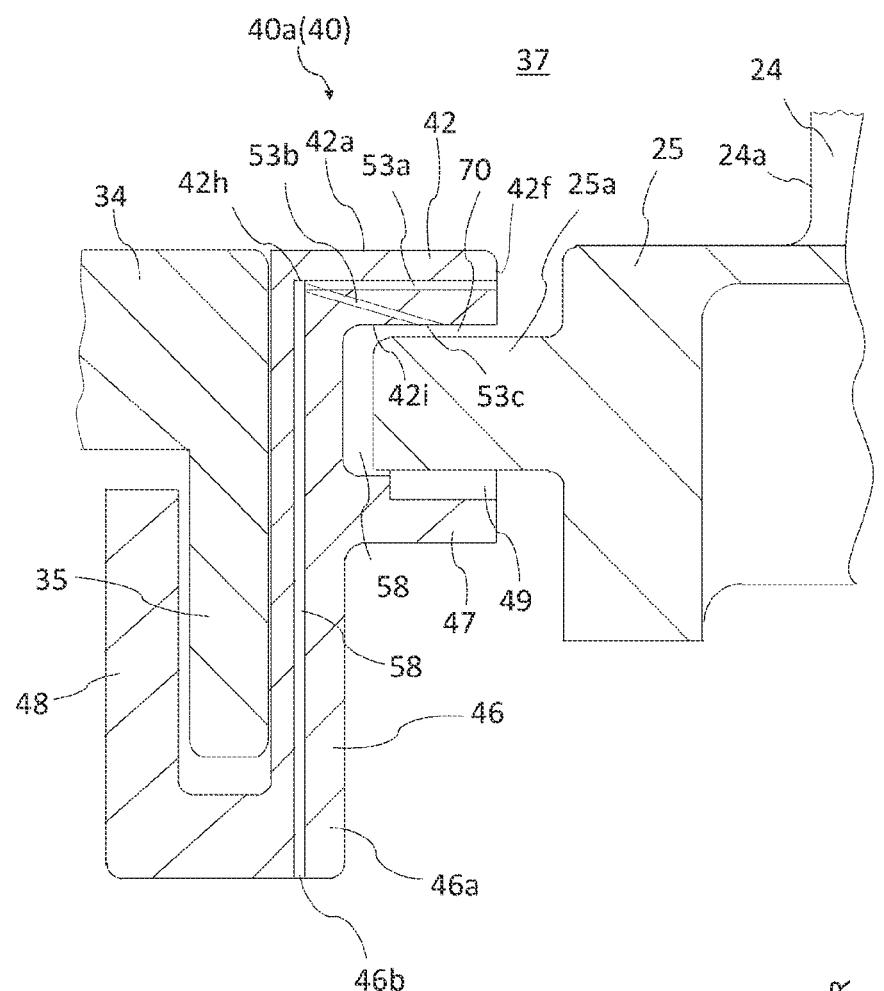
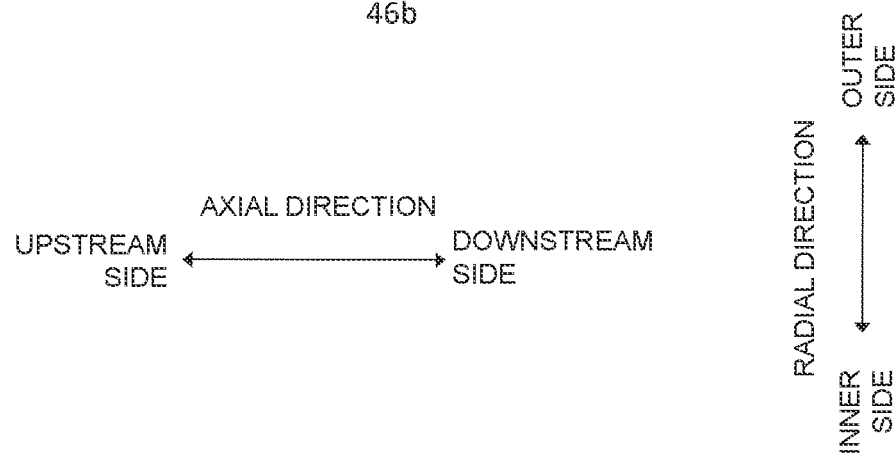

SEALING MEMBER AND GAS TURBINE

TECHNICAL FIELD

The present disclosure relates to a sealing member of a combustor and a gas turbine using the same.

This application claims priority based on Japanese Patent Application No. 2021-037153 filed with the Japan Patent Office on Mar. 9, 2021, the content of which is incorporated herein.

BACKGROUND

In a gas turbine, air compressed by a compressor is mixed with fuel in a combustor, and the mixture is combusted to generate high-temperature combustion gas. The turbine having a stator blade and a rotor blade rotates a rotor and a generator extracts power. A sealing member is provided between the combustor and the stator blade of the turbine. Since the sealing member is in contact with high-temperature combustion gas, a cooling air passage is provided in the sealing member, and cooling air is supplied to the cooling air passage to cool the body of the sealing member and prevent heat damage to the sealing member. An example of a cooling structure for a sealing member is disclosed in Patent Document 1.

CITATION LIST

Patent Literature

Patent Document 1: JP2000-257862A

SUMMARY

Technical Problems

However, since the cooling air for cooling the sealing member is discharged into a combustion gas flow path after cooling the sealing member, there is a demand for further reduction of the cooling air from the viewpoint of improving the performance of the gas turbine.

An object of the present disclosure is to provide a sealing member capable of reducing the amount of cooling air while suppressing heat damage to the sealing member due to combustion gas.

Solution to Problem

One aspect of the present disclosure provides a sealing member that forms a combustion gas flow path of a gas turbine, the sealing member including: a first body portion extending in an axial direction and a circumferential direction and having a cooling passage therein, wherein the first body portion includes: a first end portion that forms one end portion in the circumferential direction; a second end portion that forms the other end portion on an opposite side in the circumferential direction; and an intermediate portion formed between the first end portion and the second end portion, the cooling passage includes: a plurality of intermediate portion cooling passages arranged in the intermediate portion, inclined at a first angle with respect to the axial direction, extending in the axial direction, and arranged in the circumferential direction; a first end portion cooling passage arranged in the first end portion, inclined at a second angle with respect to the axial direction, extending in the axial direction, and arranged in the circumferential direction; and a plurality of second end portion cooling passages arranged in the second end portion, inclined at a third angle with respect to the axial direction, extending in the axial direction, and arranged in the circumferential direction, and the second angle and the third angle are smaller than the first angle.

Advantageous Effects

According to the sealing member according to the present disclosure, the amount of cooling air is reduced while suppressing heat damage to the sealing member due to combustion gas, and the performance of the gas turbine is improved.

BRIEF DESCRIPTION OF DRAWING

FIG. 7 is a schematic diagram of Arrangement 2 of cooling passages.

FIG. 10 is a combined structural diagram of a sealing member and a turbine stator blade.

DETAILED DESCRIPTION

Hereinafter, embodiments of the present disclosure will be described based on the drawings.

<<Configuration of Gas Turbine>>

A gas turbine to which the sealing member is applied will be described with reference to FIG. 1. Note that FIG. 1 is a schematic configuration diagram showing a gas turbine 1 of an embodiment to which a sealing member is applied.

Figure 1:
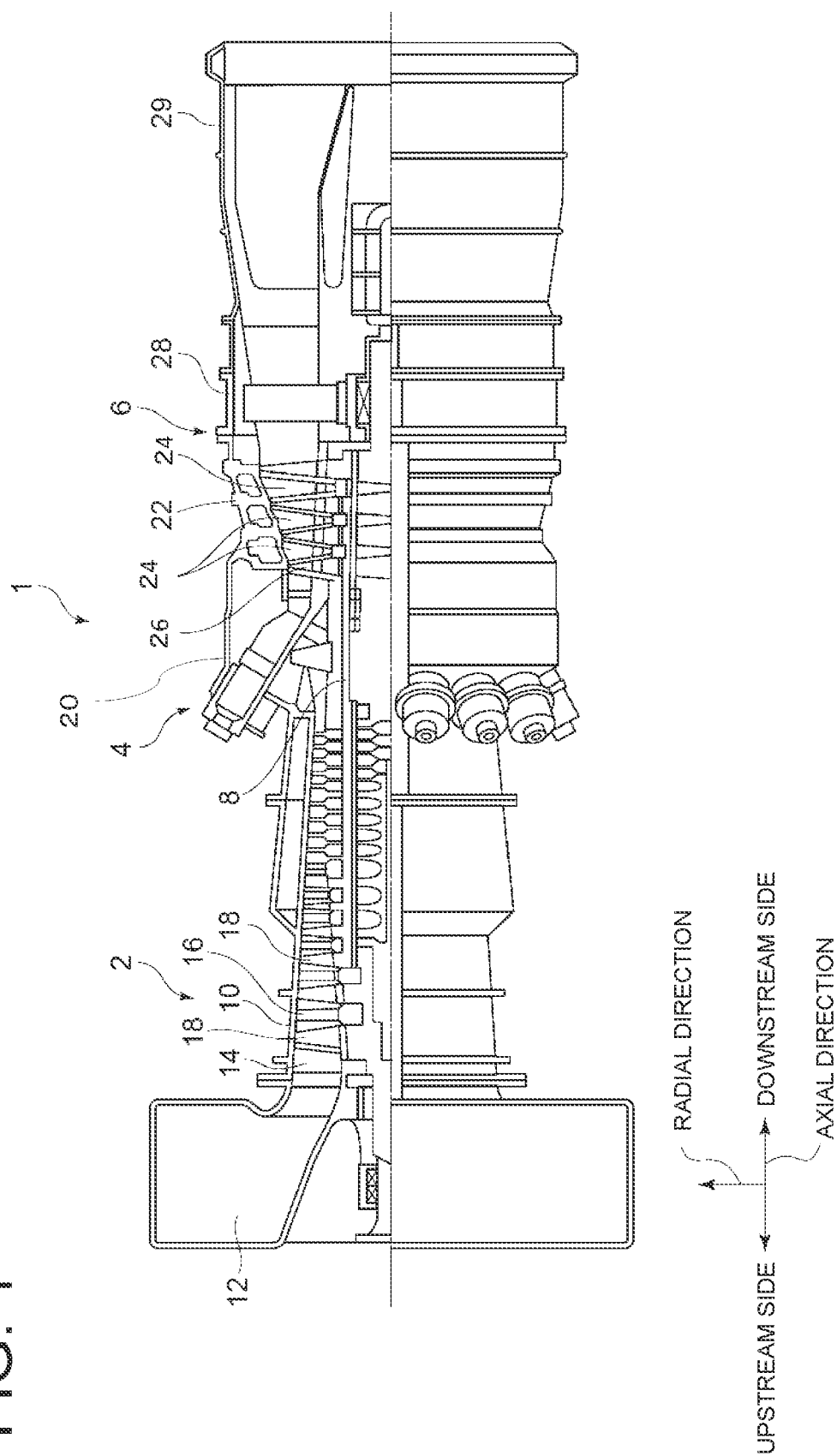
FIG. 1 is a schematic configuration diagram of a gas turbine according to an embodiment of the present disclosure.

As shown in FIG. 1, the gas turbine 1 according to an embodiment includes a compressor 2 for generating compressed air, a combustor 4 for generating combustion gas G using compressed air A and fuel, and a turbine 6 driven to rotate by the combustion gas G. In the case of the gas turbine 1 for power generation, a generator (not shown) is connected to the turbine 6 so power is generated by the rotational energy of the turbine 6.

Each configuration of the gas turbine 1 will be described with reference to FIG. 1.

The compressor 2 includes a compressor casing 10, an intake chamber 12 provided in an inlet side of the compressor casing 10 so as to take in air, a rotor 8 provided so as to pass through both the compressor casing 10 and a turbine casing 22 to be described later, and various blades arranged in the compressor casing 10. The various blades include an inlet guide blade 14 provided on the intake chamber 12 side, a plurality of compressor stator blades 16 fixed to the compressor casing 10 side, and a plurality of compressor rotor blades 18 implanted in the rotor 8 so as to be arranged alternately in the axial direction with respect to the compressor stator blades 16. In such a compressor 2, the air taken from the intake chamber 12 compressed while passing through the plurality of compressor stator blades 16 and the plurality of compressor rotor blades 18 whereby compressed air A is generated. The compressed air A is sent from the compressor 2 to the combustor 4 on the axial downstream side.

The combustor 4 is arranged within a casing 20. As shown in FIG. 1, a plurality of combustors 4 are annularly arranged around the rotor 8 within the casing 20. The combustor 4 is supplied with fuel and the compressed air A generated by the compressor 2, and combusts the fuel to generate a high-temperature, high-pressure combustion gas G, which is an operating fluid for the turbine 6. The generated combustion gas G is sent from the combustor 4 to the turbine 6 in the subsequent stage on the axial downstream side.

The turbine 6 includes a turbine casing (casing) 22 and various turbine blades arranged within the turbine casing 22. The various turbine blades include a plurality of turbine stator blades 24 fixed to the turbine casing 22 side and a plurality of turbine rotor blades 26 implanted in the rotor 8 so as to be arranged alternately in the axial direction with respect to the turbine stator blades 24.

In the turbine 6, the rotor 8 extends in the axial direction, and the combustion gas G discharged from the turbine casing 22 is discharged to the exhaust casing 28 on the axial downstream side. In FIG. 1, the left side in the drawing is the axial upstream side, and the right side in the drawing is the axial downstream side. Further, in the following description, simply describing a radial direction means a direction perpendicular to the rotor 8. Moreover, when described as a circumferential direction, it represents the rotation direction of the rotor 8.

The turbine rotor blade 24 is configured to generate rotational driving force from the high-temperature, high-pressure combustion gas G flowing inside the turbine casing 22 together with the turbine stator blade 24. This rotational driving force is transmitted to the rotor 8 to drive a generator (not shown) connected to the rotor 8.

An exhaust chamber 29 is connected to the axial downstream side of the turbine casing 22 via an exhaust casing 28. The combustion gas G after driving the turbine 6 is discharged to the outside through the exhaust casing 28 and the exhaust chamber 29.

<<Structure Around Combustor>>

Figure 2:
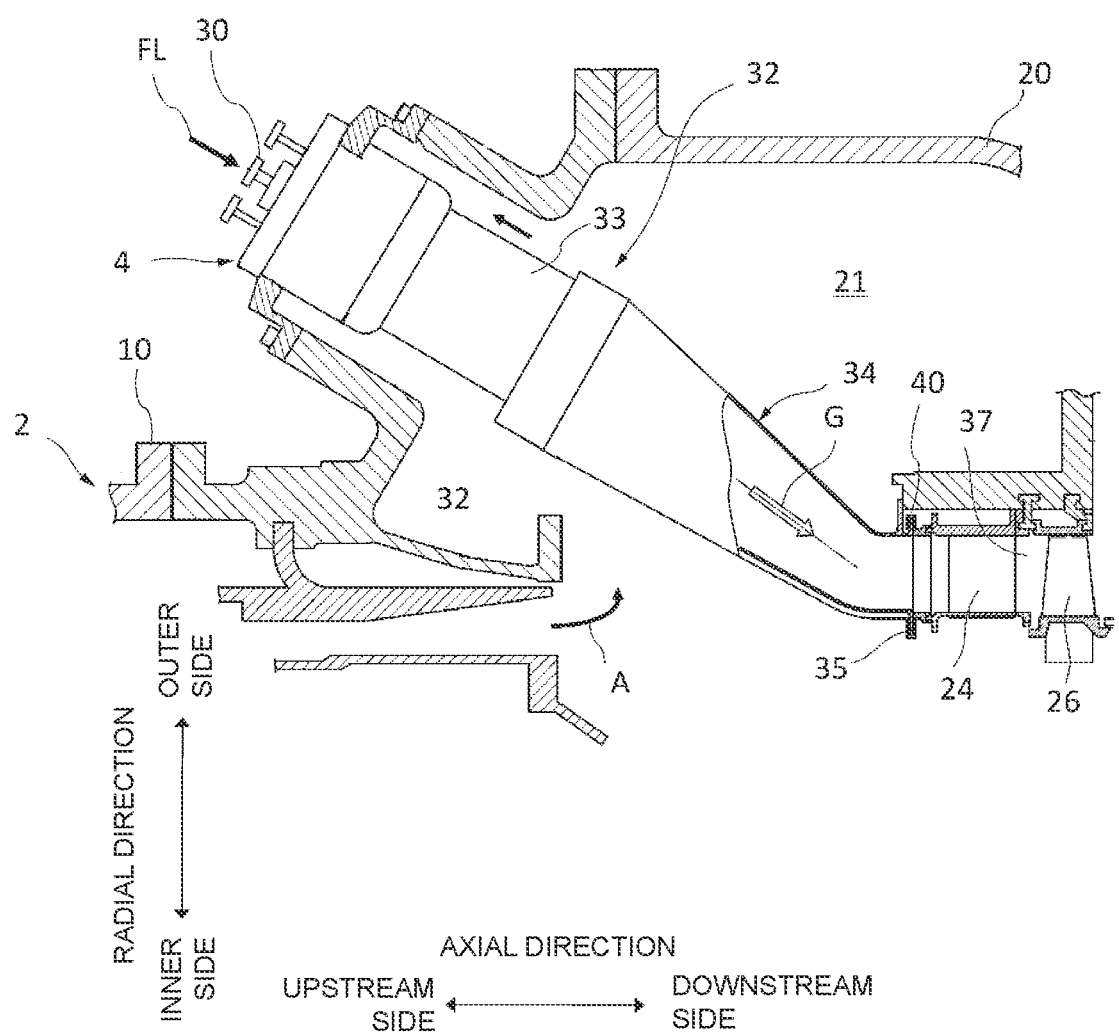
FIG. 2 is a diagram showing a configuration around a combustor according to an embodiment of the present disclosure.
Figure 3:
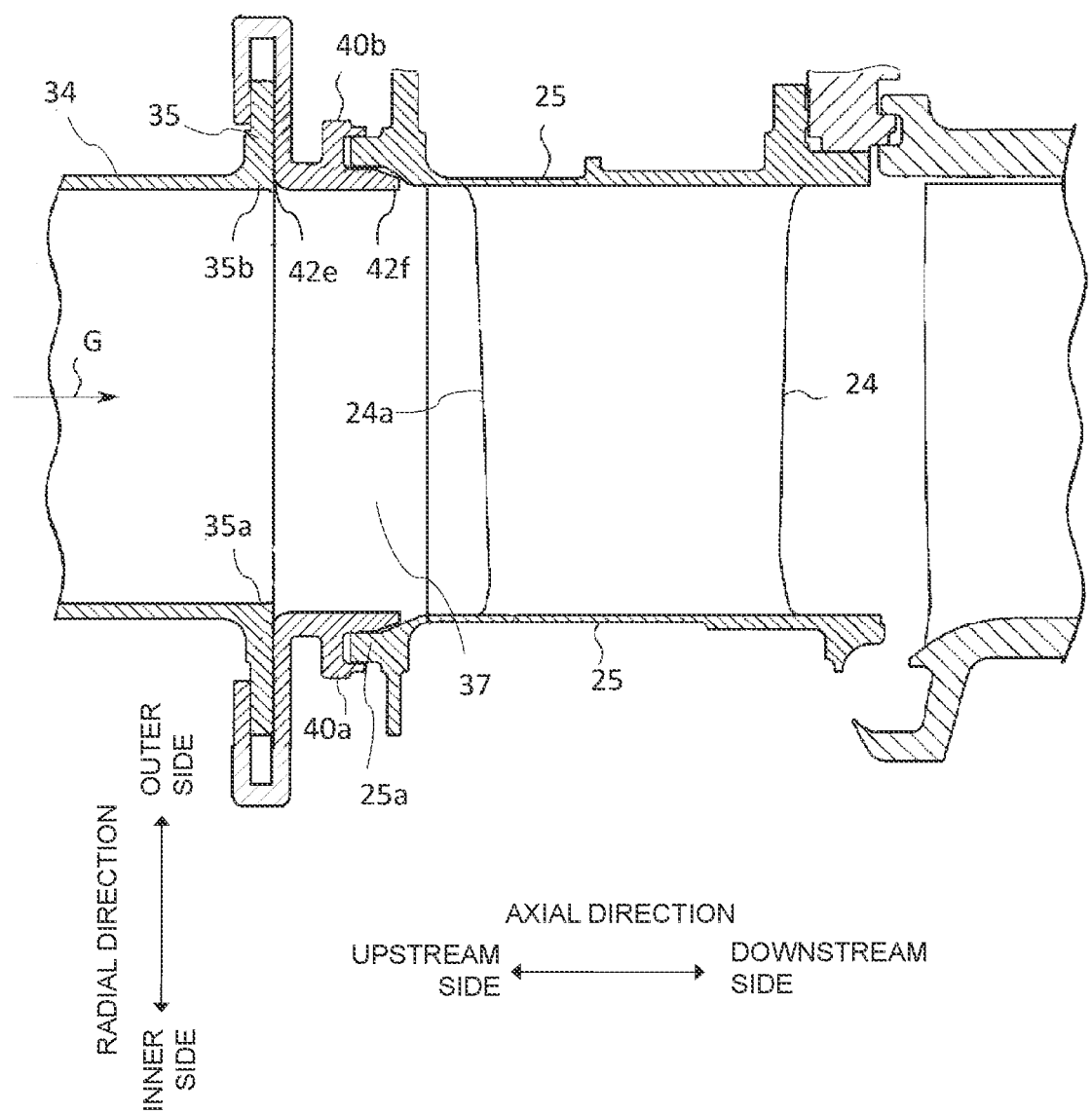
FIG. 3 is a diagram showing a configuration around a sealing member according to an embodiment of the present disclosure.

FIG. 2 shows a schematic structure around the combustor 4 of the gas turbine 1 in one aspect. FIG. 3 shows the structure around the turbine stator blade 24 and the sealing member 40. As shown in FIG. 2, a plurality of combustors 4 are arranged annularly in a casing 20 around the rotor 8 and are mounted in the casing 20. The combustor 4 has a plurality of fuel nozzles 30 that supply the fuel FL to the combustor 4 and a combustion cylinder 32 that mixes and combusts the fuel FL and the compressed air A. The combustion cylinder 32 has a combustion basket 33 that combusts the fuel FL and the compressed air A to generate the combustion gas G, and a transition piece 34 that supplies the combustion gas G to the turbine 6. A flange 35 connected to the turbine stator blade 24 via the sealing member 40 is arranged at the axial downstream end of the transition piece 34. The flange 35 is formed along the entire circumference of the transition piece 34 which forms a combustion gas flow path 37.

As shown in FIG. 3, a predetermined gap is provided between the flange 35 of the transition piece 34 and the turbine stator blade 24 connected on the axial downstream side to absorb thermal expansion in the axial direction, and a removable sealing member 40 is inserted therein. A plurality of sealing members 40 are annularly arranged around the rotor 8.

The sealing member 40 is connected to the flange 35 of the transition piece 34 at an axial upstream end 42e, and is connected to the turbine stator blade 24 at an axial downstream end 42f. The cross-sectional shape of the flange 35 of the transition piece 34 forming the combustion gas flow path 37 as seen from the axial downstream side forms an annular outer edge 35b with a long radial outer side and an annular inner edge 35a with a short radial inner side to form an overall rectangular passage cross-section.

<<Sealing Member>>

The sealing member 40 is divided in the circumferential direction, and an inner sealing member 40a arranged on the radial inner side and an outer sealing member 40b arranged on the radial outer side are combined to form one set of sealing members 40. One set of sealing members 40 is arranged on the axial downstream side corresponding to one set of combustors 4.

The sealing member 40 has an axial upstream side connected to the transition piece 34 forming the combustion gas flow path 37 via the flange 35, and an axial downstream side detachably fitted to the shroud 25 of the turbine stator blade 24. The radial outer surface of the inner sealing member 40a (corresponding to the outer surface of the inner edge 35a) and the radial inner surface of the outer sealing member 40b (corresponding to the inner surface of the outer edge 35b) are in contact with the combustion gas flow path 37.

Figure 4:
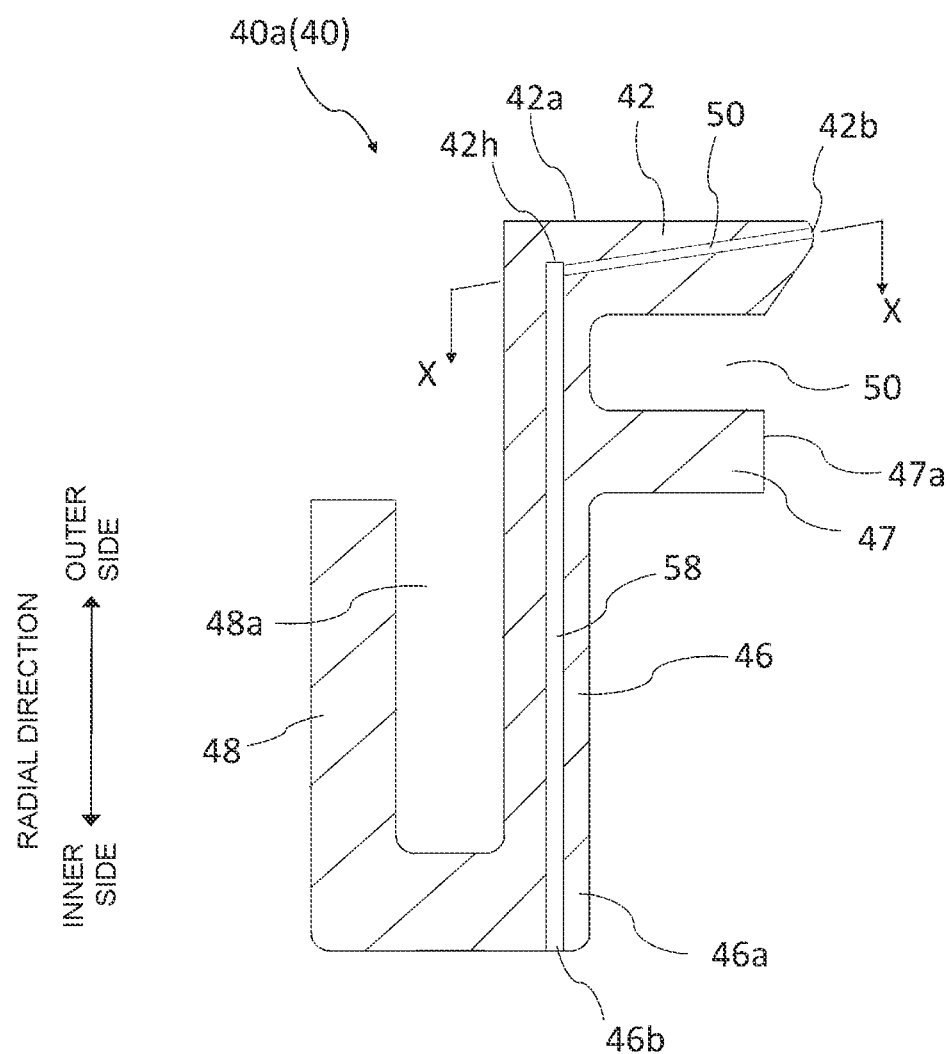
FIG. 4 is a configuration diagram of a sealing member according to an embodiment of the present disclosure.

FIG. 4 shows the structure of the inner sealing member 40a as an example of the sealing member 40. The inner sealing member 40a is formed integrally and includes a plate-shaped first body portion 42 positioned on the outer side in the radial direction, extending in the downstream direction from the axial upstream side, and extending in the circumferential direction, a plate-shaped second body portion 46 connected to the axial upstream end 42e of the first body portion 42, extending in the radial inward direction, and extending in the circumferential direction, a plate-shaped third body portion 47 protruding in the axial downstream direction from a radial intermediate position of the second body portion 46, and a fitting portion 48 connected to an end portion 46a on the radial inner side of the second body portion 46, extending in the axial upstream direction, and extending in the radial outward direction. The radial inner end is closed between the second body portion 46 and the fitting portion 48 to form a gap extending in the radial outward direction to create a structure in which the flange 35 of the transition piece 34 can be inserted from the radial outer side. Moreover, a recess portion 50 recessed toward the axial upstream side from the axial downstream end 42f of the first body portion 42 is formed between the first body portion 42 and the third body portion 47 to create a structure in which a protruding portion 25a (FIG. 3) protruding toward the axial upstream side of the shroud 25 on a front edge 24a of the turbine stator blade 24 can be fitted into the recess portion 50. The inner sealing member 40a is provided with a cooling passage 50, which will be described later, in order to suppress heat damage due to heat input from the combustion gas flow path 37. The compressed air A in the space 21 surrounded by the casing 20 is applied to the cooling air supplied to the cooling passage 50.

<Configuration of Cooling Passage>

As shown in FIG. 4, the outer surface 42a facing the radial outer side of the first body portion 42 forms a gas path surface facing the combustion gas flow path 37. Accordingly, the first body portion 42 is provided with a cooling passage 50 therein in order to suppress heat damage due to heat input from the combustion gas G flowing through the combustion gas flow path 37. A plurality of cooling passages 50 extend in the axial direction, are arranged at regular intervals in the circumferential direction, and are connected to openings 42b formed in the combustion gas flow path 37 at the axial downstream end 42f of the first body portion 42. The cooling passage 50 is formed as an inclined passage having an inclination angle α with respect to the axial direction, except for a part thereof. A plurality of supply passages 58 extending in the radial direction are arranged at regular intervals in the circumferential direction inside the second body portion 46 which is connected to the axial upstream end 42e of the first body portion 42 and extends in the radial direction. An opening 46b connected to the supply passage 58 is formed in the end portion 46a on the radial inner side of the second body portion 46. The supply passage 58 is connected to the cooling passage 50 arranged inside the first body portion 42 on the radial outer side of the second body portion 46 via a connection point 42h. The supply passage 58 communicates with the space 21 (FIG. 2) surrounded by the casing 20 via the opening 46b. The cooling passage 50 and the supply passage 58 may have the same hole diameter d, or the hole diameter d of the cooling passage 50 may be smaller than the hole diameter d of the supply passage 58. By making the hole diameter d of the supply passage 58 larger than the hole diameter d of the cooling passage 50, the pressure loss of the cooling air in the supply passage 58 is reduced, and higher-pressure cooling air is supplied to the cooling passage 50. An embodiment of the arrangement of the cooling passages 50 arranged in the first body portion 42 is described below.

Embodiment

Figure 5:
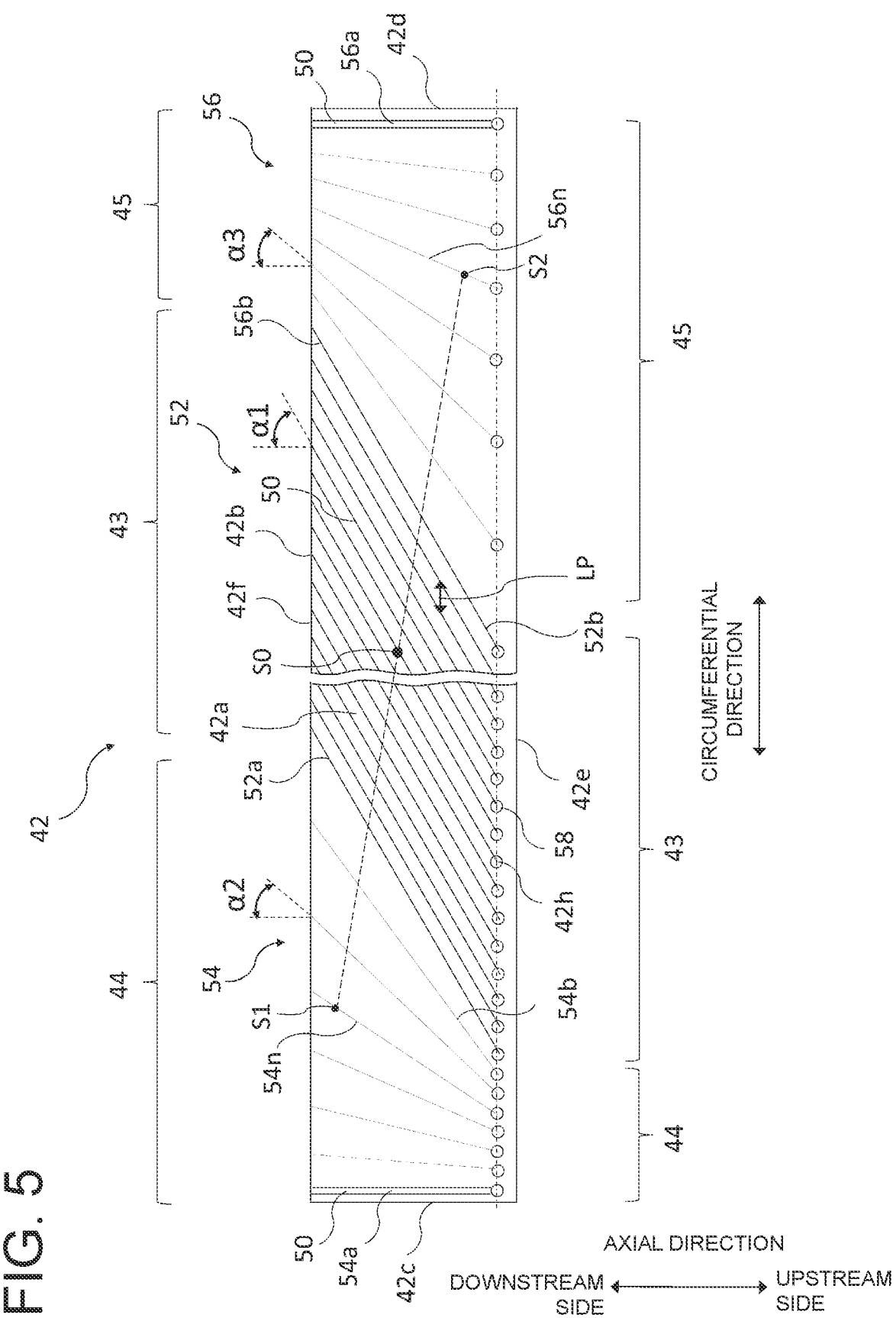
FIG. 5 is a layout diagram of a cooling passage of a sealing member of an embodiment according to the present disclosure, and shows a cross-section along line X-X of FIG. 4.

FIG. 5 shows the X-X cross-section of FIG. 4 and shows a layout diagram of the cooling passages 50 arranged in the first body portion 42 as seen from the radial outer side. As shown in FIG. 5, the first body portion 42 is divided into three regions in which the cooling passages 50 are arranged differently in the circumferential direction of the first body portion 42. The first body portion 42 includes an intermediate portion 43 arranged in a circumferential intermediate region of the first body portion 42, a first end portion 44 arranged in a region extending from a first end surface 42c, which is one end portion of the first body portion 42 in the circumferential direction, to the intermediate portion 43, and a second end portion 45 arranged in a region extending from a second end surface 42d, which is the other end portion of the first body portion 42 in the circumferential direction, to the intermediate portion 43. The cooling passage 50 formed in the first body portion 42 includes an intermediate portion cooling passage 52 formed in the intermediate portion 43, a first end portion cooling passage 54 formed in the first end portion 44, and a second end portion cooling passage 56 formed in the second end portion 45.

<<Intermediate Portion Cooling Passage>>

The cooling passage 50 of the first body portion 42 is formed of a plurality of inclined passages having an inclination angle α with respect to the axial direction. The intermediate portion cooling passage 52 is composed of a plurality of linear inclined passages that have the same inclination angle α1 (first angle) with respect to the axial direction and are arranged at regular arrangement pitches (intervals) LP in the circumferential direction. The axial upstream end of the intermediate portion cooling passage 52 is formed inside the second body portion 46 and is connected via a connection point 42h to a plurality of supply passages 58 arranged at regular arrangement pitches (intervals) LP in the circumferential direction. The supply passages 58 extend in the radial direction of the second body portion 46 and are individually connected to the cooling passages 50 of the first body portion 42 in one-to-one correspondence. Here, instead of the circumferential arrangement pitch (interval) LP of the cooling passages 50, an opening density may be applied. That is, the intermediate portion cooling passage 52 is formed of a cooling passage 50 composed of a plurality of inclined passages that are parallel to each other in the circumferential direction and have the same opening density. In addition, when the hole diameter d and the arrangement pitch (interval) LP of the cooling passages 50 are given, the opening density can be expressed as [d/LP]. The inclination angle α (α1, α2, α3) of the cooling passage 50 with respect to the axial direction means an acute angle in the clockwise direction with respect to the axial direction in FIG. 5.

<<First End Portion Cooling Passage>>

As shown in FIG. 5, the first end portion cooling passage 54 is arranged on the first end portion 44 side so as to be adjacent, in the circumferential direction, to the cooling passage 52a of the intermediate portion cooling passage 52 that is closest to the first end surface 42c. The first end portion cooling passage 54 is formed of a plurality of cooling passages 50 arranged at predetermined intervals in the circumferential direction between the first end surface 42c and the intermediate portion 43. The cooling passages 50 forming the first end portion cooling passage 54 are arranged at the axial intermediate position so that the circumferential arrangement pitch (interval) LP increases, the inclination angle α with respect to the axial direction increases, or the opening density decreases as it approaches from the first end surface 42c toward the intermediate portion cooling passage 52 in the circumferential direction. That is, the first end portion cooling passage 54 is configured as a linear inclined passage that is inclined in the same direction as the intermediate portion cooling passage 52 so that the inclination angle α with respect to the axial direction is an inclination angle α2 (second angle) smaller than the inclination angle α1 (first angle) of the intermediate portion cooling passage 52. The first end portion cooling passage 54 is connected via the connection point 42h to the supply passage 58 formed inside the second body portion 46 at the axial upstream end 42e of the first body portion 42. Among the supply passages 58 extending in the radial direction of the second body portion 46, the supply passage 58 connected to the first end portion cooling passages 54 at the radial outer ends are arranged at regular intervals (same arrangement pitch LP) in the circumferential direction of the second body portion 46. Accordingly, the circumferential arrangement pitch LP of the cooling passages 50 at the axial upstream end 42e of the first end portion cooling passage 54 to which the supply passage 58 is connected is the same as the arrangement pitch LP of the supply passages 58. The cooling passage 54a arranged closest to the first end surface 42c side among the cooling passages 50 forming the first end portion cooling passage 54 is arranged along the axial direction substantially parallel to the first end surface 42c.

As shown in FIG. 5, as described above, the first end portion cooling passage 54 is arranged in a range from the first end surface 42c of the first body portion 42 to the intermediate portion cooling passage 52 toward the second end surface 42d, which is the other end portion in the circumferential direction. As described above, the cooling passages 50 at the axial upstream end 42e of the first end portion cooling passages 54 are arranged at the same arrangement pitch (interval) LP or opening density in the circumferential direction. However, the arrangement pitch (interval) LP may be smaller or the opening density may be larger than the circumferential arrangement pitch (interval) LP or the opening density of the cooling passages 50 at the axial upstream end 42e of the intermediate portion cooling passage 52. On the other hand, the circumferential arrangement pitch (interval) LP or the inclination angle α with respect to the axial direction of the cooling passages 50 at the axial downstream end 42f of the first end portion cooling passage 54 gradually increases as it approaches from the first end surface 42c side toward the intermediate portion cooling passage 52, and the opening density gradually decreases as it approaches from the first end surface 42c side toward the intermediate portion cooling passage 52.

<<Second End Portion Cooling Passage>>

As shown in FIG. 5, the second end portion cooling passage 56 is arranged adjacent to the second end portion 45 side on the opposite side in the circumferential direction of the first end portion cooling passage 54 with respect to the cooling passage 52b closest to the second end surface 42d of the intermediate portion cooling passage 52. The second end portion cooling passage 56 is formed of a plurality of cooling passages 50 arranged at predetermined intervals in the circumferential direction between the second end surface 42d and the intermediate portion 43. The cooling passages 50 forming the second end portion cooling passage 56 are arranged at the axial intermediate position so that the circumferential arrangement pitch (interval) LP increases, the inclination angle α with respect to the axial direction increases, or the opening density decreases as it approaches from the second end surface 42d side toward the intermediate portion cooling passage 52 in the circumferential direction. That is, the second end portion cooling passage 56 is configured as a linear inclined passage that is inclined in the same direction as the cooling passages 50 of the intermediate portion cooling passage 52 so that the inclination angle α with respect to the axial direction is an inclination angle α3 (third angle) smaller than the inclination angle α1 (first angle) of the intermediate portion cooling passage 52. The second end portion cooling passage 56 is connected via the connection point 42h to the supply passage 58 formed inside the second body portion 46 at the axial upstream end 42e of the first body portion 42. The supply passages 58 of the second body portion 46 are configured as the supply passages 58 arranged parallel to each other in the circumferential direction of the second body portion 46. The cooling passage 56a arranged closest to the second end surface 42d among the cooling passages 50 forming the second end portion cooling passage 56 is along the axial direction substantially parallel to the second end surface 42d.

As described above, the second end portion cooling passage 56 is arranged between the second end surface 42d of the first body portion 42 and the intermediate portion cooling passage 52. The cooling passages 50 at the axial downstream end 42f of the second end portion cooling passage 56 are arranged at the same arrangement pitch (interval) LP or opening density in the circumferential direction, and are arranged at the same arrangement pitch (interval) LP or opening density as the intermediate portion cooling passages 52. On the other hand, the circumferential arrangement pitch (interval) LP of the cooling passages 50 at the axial upstream end 42e of the second end portion cooling passage 56 gradually increases as it approaches from the second end surface 42d side toward the intermediate portion cooling passage 52, and the opening density gradually decreases as it approaches from the second end surface 42d side toward the intermediate portion cooling passage 52. Similarly to the first end portion cooling passages 54, the second end portion cooling passages 56 are connected to the supply passages 58 of the second body portion 46 via the connection point 42h in one-to-one correspondence at the axial upstream end 42e. The supply passages 58 in the second body portion 46 are arranged in parallel to each other at the same circumferential arrangement pitch (interval) LP as the arrangement pitch (interval) LP of the second end portion cooling passages 56 at the axial upstream end 42e of the first body portion 42.

As shown in FIG. 5, all the cooling passages 50 of the intermediate portion cooling passage 52 are configured as linear inclined passages having the same inclination angle α1, which is larger than the inclination angle α with respect to the axial direction than the cooling passages 50 of the first end portion cooling passage 54 and the second end portion cooling passage 56. The circumferential opening density of the cooling passages 50 at the axial intermediate position of the intermediate portion cooling passage 52 is larger than that of the first end portion cooling passages 54 and the second end portion cooling passages 56, and the circumferential arrangement pitch (interval) LP of the cooling passages 50 at the axial intermediate position of the intermediate portion cooling passage 52 is smaller than that of the first end portion cooling passages 54 and the second end portion cooling passages 56.

The intermediate portion cooling passage 52 formed in the intermediate portion 43, the first end portion cooling passage 54 formed on the first end portion 44 side, and the second end portion cooling passage 56 formed on the second end portion 45 side are set by the arrangement of the cooling passages 50 as described above. As shown in FIG. 5, the circumferential widths of the first body portion 42 at the axial upstream end 42e and the axial downstream end 42f are substantially the same. Therefore, when the above-described intermediate portion cooling passage 52 is arranged in the intermediate portion 43 of the first body portion 42, the circumferential width of a portion where the intermediate portion cooling passages 52 are formed is the circumferential width between the cooling passage 52a and the cooling passage 52b, and the circumferential width at the axial upstream end 42e and the circumferential width at the axial downstream end 42f are substantially the same. On the other hand, since the intermediate portion cooling passages 52 are formed as inclined passages, the circumferential widths at the axial upstream end 42e and the axial downstream end 42f on the first end portion 44 side and the second end portion 45 side with the intermediate portion 43 where the intermediate portion cooling passages 52 are formed sandwiched in the circumferential direction are not the same, but the circumferential width is large on one side and is small on the other side. In the case of the embodiment shown in FIG. 5, the circumferential width at the axial upstream end 42e on the first end portion 44 side where the first end portion cooling passage 54 is formed is smaller than the circumferential width at the axial downstream end 42f, and the circumferential width at the axial upstream end 42e on the second end portion 45 side where the second end portion cooling passage 56 is formed is larger than the circumferential width at the axial downstream end 42f.

The cooling passages 50 shown in FIG. 5 are an example in which the cooling passages 50 are inclined in a direction from the first end surface 42c side toward the second end surface 42d side as it approaches the axial downstream side and arranged at an inclination angle α forming an acute angle in the clockwise direction with respect to the axial direction. On the other hand, conversely, all the cooling passages 50 arranged in the first body portion 42 may be arranged so that the cooling passages 50 are inclined in a direction from the second end surface 42d side toward the first end surface 42c side as it approaches the axial downstream side and arranged at an inclination angle α forming an acute angle in the counterclockwise direction with respect to the axial direction. In that case, the circumferential width at the axial upstream end 42e on the first end portion 44 side where the first end portion cooling passage 54 is formed is larger than the circumferential width at the axial downstream end 42f. Further, the circumferential width at the axial upstream end 42e on the second end portion 45 side where the second end portion cooling passage 56 is formed is smaller than the circumferential width at the axial downstream end 42f. That is, the magnitude relationship between the circumferential widths at the axial upstream end 42e and the axial downstream end 42f on the first end portion 44 side where the first end portion cooling passage 54 is arranged is reverse to the magnitude relationship between the circumferential widths at the axial upstream end 42e and the axial downstream end 42f on the second end portion 45 side where the second end portion cooling passage 56 is arranged. The above description has been made for the case where the circumferential widths at the axial upstream end 42e and the axial downstream end 42f of the first body portion 42 are substantially the same. However, the same concept can be applied when the axial upstream end 42e of the first body portion 42 has a larger circumferential width than the axial downstream end 42f.

Incidentally, since the outer surface 42a of the first body portion 42 faces the combustion gas flow path 37, it is heated by heat input from the combustion gas G. Therefore, the first body portion 42 needs to be cooled to an allowable metal temperature or lower. In particular, the intermediate portion 43 is more easily heated than the first end portion 44 and the second end portion 45 on both sides in the circumferential direction, and the allowable metal temperature is kept low. On the other hand, since the first end portion 44 and the second end portion 45 have a relatively low thermal load compared to the intermediate portion 43, and the heat restraint from the other sealing members 40 adjacent in the circumferential direction is also small, the generated thermal stress is small. Therefore, the allowable metal temperature of the first end portion 44 and the second end portion 45 can be set higher than the allowable metal temperature of the intermediate portion 43. That is, the arrangement density of the cooling passages 50 arranged in the first end portion 44 and the second end portion 45 can be made smaller than the arrangement density of the cooling passages 50 arranged in the intermediate portion 43 within a range not exceeding the allowable metal temperature. That is, the circumferential arrangement pitch (interval) LP of the cooling passages 50 arranged on the first end portion 44 side and the second end portion 45 side can be made larger than the circumferential arrangement pitch (interval) LP of the cooling passages 50 in the intermediate portion 43 at the same axial position so that the surface area of the cooling passages 50 per unit area of the first body portion 42 is reduced. Here, the arrangement density of the cooling passages 50 means the surface area of the cooling passages 50 arranged in a range per unit area of the first body portion 42.

<<Cooling Capacity of Cooling Passage>>

Figure 6:
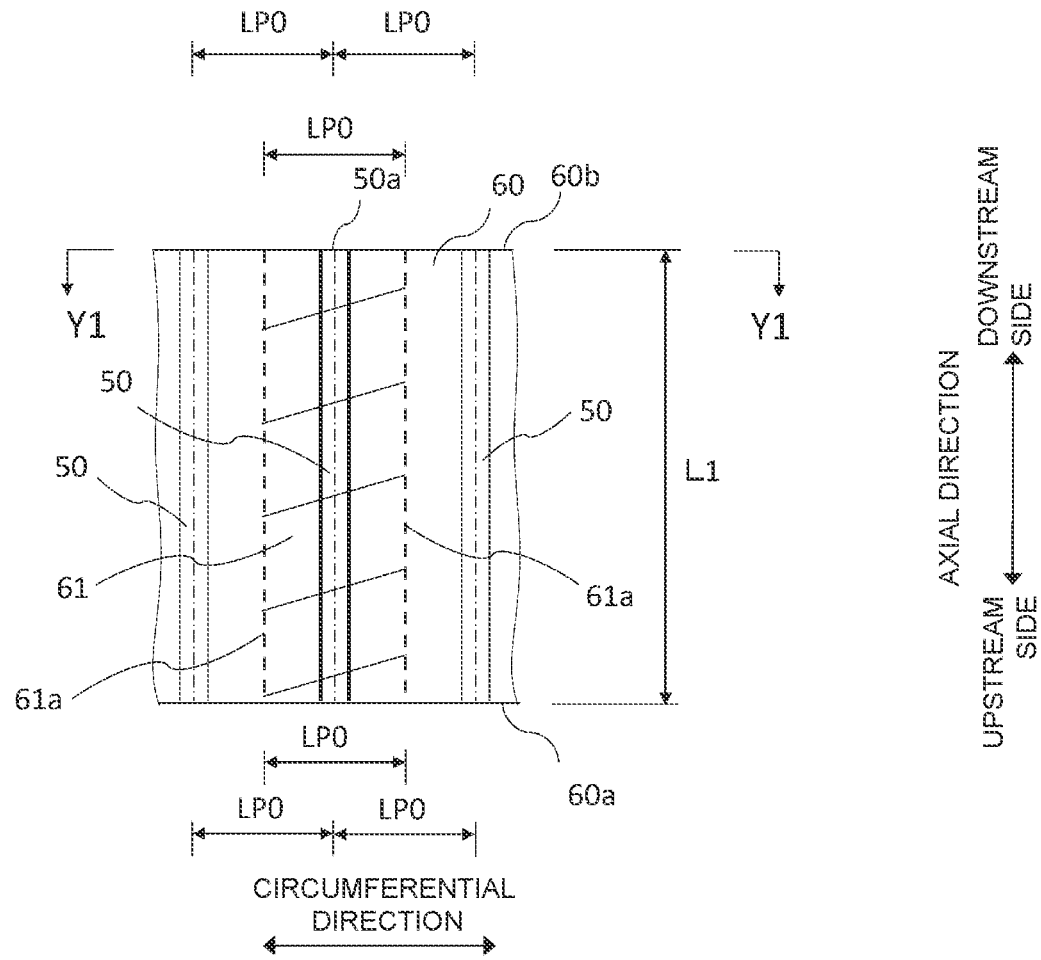
FIG. 6 is a schematic diagram of Arrangement 1 of cooling passages.

Next, the relationship between the inclination angle α and the cooling capacity of the cooling passage, which is an inclined passage, will be described below. FIG. 6 is a schematic diagram of Arrangement 1 of the cooling passages 50. FIG. 7 is a schematic diagram of Arrangement 2 of the cooling passages 50. FIGS. 6 and 7 show a cooling structure which includes a plurality of cooling passages 50 formed inside the same flat plate members 60 and extending in the axial direction and arranged at predetermined intervals in the circumferential direction and which cools the plate members 60 with cooling air flowing through the cooling passages 50. Arrangement 1 shown in FIG. 6 shows the arrangement of the cooling passages 50 in which the extension direction of the cooling passages 50 coincides with the axial direction. Arrangement 2 shown in FIG. 7 shows the arrangement of the cooling passages 50 having inclined passages with an inclination angle [α0] with respect to the axial direction. Arrangement 1 in FIG. 6 and Arrangement 2 in FIG. 7 will be compared to explain the relationship between the inclination angle α and the cooling capacity of the cooling passage 50.

As shown in FIGS. 3 and 4, in the sealing member 40 of the present embodiment, since the first body portion 42 is heated by the heat of the combustion gas G input from the outer surface 42a, which is the gas path surface in contact with the combustion gas G, the first body portion 42 is cooled by the cooling air flowing through the cooling passage 50. The plate member 60 shown in FIGS. 6 and 7 corresponds to the first body portion 42 of the sealing member 40.

The cooling passages 50 of Arrangement 1 shown in FIG. 6 have the most basic and common convection cooling structure for plate members, in which the cooling passages 50 formed inside the plate member 60 and extending in the axial direction at an inclination angle [0 degrees] with respect to the axial direction of the plate member 60 are arranged at a predetermined arrangement pitch LP0 in the circumferential direction of the plate member 60.

A cross-section Y1-Y1 of Arrangement 1 shown in FIG. 6 shows a cross-section of the plate member 60 viewed from the axial downstream side, and shows a structure in which the cooling passages 50 are arranged at an arrangement pitch LP0 in the circumferential direction. In the cooling passages 50 with the circumferential arrangement pitch LP0 shown in Arrangement 1, the cooling passages 50 are arranged so as to cool the heat of the combustion gas input from the outside into the plate member 60 so that the metal temperature at the axial downstream end 60b of the plate member 60 is an allowable value or lower to suppress heat damage to the plate member 60. That is, the cooling capacity of one of the plurality of cooling passages 50 arranged in the circumferential direction is proportional to the surface area of the cooling passage 50. Further, as the range of the plate member 60 that can be cooled by one cooling passage 50, a certain region of the plate member 60 extending to both sides in the circumferential direction from the central axis 50a of the cooling passage 50 is set as a heating region 61. In FIG. 6, the heating region 61 is defined as a range having a width in the circumferential direction of the plate member 60 corresponding to the arrangement pitch LP0 around the central axis 50a of the cooling passage 50, and extending to the axial upstream end 60a and the axial downstream end 60b of the plate member 60. That is, the heating region 61 is defined as a rectangular region which is surrounded by two first intermediate lines 61a defining an intermediate line between the cooling passages 60 on both sides adjacent in the circumferential direction about the central axis 50a of one cooling passage 50 and the axial upstream end 60a and the axial downstream end 60b of the plate member 60 and which has an axial width L1 and a circumferential width LP0 corresponding to the passage length of the cooling passage 50. The passage length L1 of the cooling passage 50 in Arrangement 1 is the same length as the axial width L1 of the plate member 60.

In Arrangement 1, it is a basic concept to select the arrangement of the cooling passages 50 so that the heat input from the combustion gas G enters the heating region 61 of the plate member 60, the heat entering the heating region 61 is cooled by the cooling air flowing through the cooling passage 50 arranged in the heating region 61, the metal temperature at the axial downstream end 60b of the plate member 60 is kept within an allowable value, and the metal temperature of the plate member 60 at the axial downstream end 60b is constant even in the circumferential direction. If Arrangement 1 of this concept is selected, it can be considered that the heating regions 61 of the plate members 60 in which the plurality of cooling passages 50 are arranged are cooled by the corresponding cooling passages 50, the metal temperature of the plate members 60 in the entire region of the plate members 60 where the cooling passages 50 are arranged is within the allowable value, and the metal temperature in the circumferential direction of the plate member 60 at the axial downstream end 60b is maintained constant.

On the other hand, the basic concept of the cooling structure of the cooling passage 50 of Arrangement 2 shown in FIG. 7 is as follows. The cooling passage 50 of Arrangement 2 is an inclined passage in which the extension direction of the cooling passage 50 does not coincide with the axial direction and has an inclination angle [α0] with respect to the axial direction. Arrangement 2 is different from Arrangement 1 in that the cooling passages 50 are arranged as inclined passages having an inclination with respect to the axial direction such that the surface area of the cooling passage 50 is increased compared to Arrangement 1 to increase the cooling capacity so that the amount of cooling air can be reduced. A cross-section Y2-Y2 shown in FIG. 7 shows a cross-section of the plate member 60 of Arrangement 2 viewed from the axial downstream end 60b, and a cross-section Y3-Y3 shows a cross-section of the plate member 60 viewed from the axial upstream end 60a. The circumferential arrangement pitch (interval) LP of the cooling passages 50 at the axial upstream end 60a is the same as the arrangement pitch LP0 of the cooling passages 50 of Arrangement 1, but the arrangement pitch LP1 at the axial downstream end 60b is larger than the arrangement pitch LP0 at the axial upstream end 60a.

Since the cooling passage 50 of Arrangement 2 shown in FIG. 7 is an inclined passage having an inclination angle [α0] with respect to the axial direction, the passage length L2 of each cooling passage 50 is larger than that of the cooling passage 50 of Arrangement 1 with respect to the central axis 50a, and the surface area of the cooling passage 50 is increased. As the surface area of the cooling passage 50 increases, the cooling capacity per cooling passage 50 increases. The increase in the cooling capacity by configuring the cooling passage 50 as an inclined passage is based on the concept that when the passage length L2 is increased in Arrangement 2, the cooling capacity per cooling passage 50 is increased, the increased cooling capacity of the cooling passage 50 cools the increased heat input from the combustion gas G. That is, by configuring the cooling passage 50 as an inclined passage, the cooling area of the heating region 61 of the plate member 60 that receives the heat input from the combustion gas G is increased. The heat input from the combustion gas G increases from the increased area of the heating region 61, and the increased input heat is cooled by the increased surface area of the cooling passage 50, whereby the amount of cooling air can be reduced while suppressing the metal temperature of the plate member 60 within the allowable range.

In other words, the cooling structure of the plate member 60 having the cooling passages 50 of Arrangement 2 can be regarded as a cooling structure having a cooling capacity equivalent to that of the cooling passages 50 of Arrangement 1 due to the increased cooling capacity of the cooling passages 50 configured as the inclined passages. The cooling passage 50 having the equivalent cooling capacity means that the cooling capacity per unit area of the heating region 61 of the plate member 60 is the same. That is, in Arrangement 2 provided with the cooling passages 50 with the increased cooling capacity as the inclined passages, it is considered that the cooling area of the heating region 61 is increased according to the increase in the cooling capacity, and the capability to absorb the heat input from the combustion gas G increases. The concept is that although the plate member 60 has the same length and width, the cooling capacity per unit area of the heating region 61 of the plate member 60 of Arrangement 2 of inclined passages is the same as the cooling capacity of the heating region 61 of the cooling passages 50 of Arrangement 1, which are not inclined passages but extend in parallel to the reference axial direction. In Arrangement 2, the increase in the heating region 61 of the plate member 60 means that since the circumferential arrangement pitch (interval) LP of the cooling passages 50 at the axial upstream end 60a of the plate member 60 is fixed, the inclination angle [α0] of the cooling passages 50 with respect to the axial direction is increased to increase the circumferential width of the heating region 61, in other words, the circumferential arrangement pitch (interval) LP of the cooling passages 50. It means that the cooling area of the heating region 61 can be increased by increasing the circumferential arrangement pitch (interval) LP of the cooling passages 50.

In the following description, the cooling structure of the cooling passages 50 of Arrangement 2 will be specifically described in comparison with Arrangement 1. As shown in FIG. 7, in the case of the cooling passage 50 having the inclination angle [α0] with respect to the axial direction of Arrangement 2, the passage length L2 along the central axis 50a of the cooling passage 50 from the axial upstream end 60a of the plate member 60 to the axial downstream end 60b is larger than the passage length L1 of the cooling passage 50 of Arrangement 1 by the difference DL. That is, in the case of the cooling passages 50 of Arrangement 2, as compared to Arrangement 1, the surface area of the cooling passage 50 is increased by the amount corresponding to the passage length difference DL between the passage length L2 of Arrangement 2 and the passage length L1 of Arrangement 1, and the cooling capacity of cooling the plate member 60 increases.

On the other hand, as shown in FIG. 7, in the heating region 63 of the plate member 60 corresponding to the cooling passages 50 of Arrangement 2, the heating region 61 of the plate member 60 increases with the increase in the cooling capacity of the cooling passage 50. That is, the heating region 63 of Arrangement 2 is set such that the heating increase area 62 corresponding to the difference DL of the passage length L2 of Arrangement 2 is calculated based on the ratio of the increased difference DL in the passage length to the passage length L1 of Arrangement 1 with reference to the cooling area of the heating region 61 corresponding to the cooling passage 50 of the passage length L1 of Arrangement 1 and the heating increase area 62 is added to the heating region 61 of Arrangement 1. In this way, the heating region 63 of Arrangement 2 after the cooling capacity is increased is selected.

In the case of Arrangement 2, as shown in FIG. 7, the arrangement pitch (interval) LP at the axial upstream end 60a of the plate members 60 is fixed to the same arrangement pitch LP0 as in Arrangement 1. On the other hand, the arrangement pitch (interval) LP at the axial downstream end 60b is increased to the arrangement pitch LP1 that is larger than the arrangement pitch LP0 in Arrangement 1. Specifically, as shown in FIG. 7, the heating region 61 in Arrangement 2 having the same cooling area as the heating region 61 in Arrangement 1 corresponds to a diamond-shaped region surrounded by a line segment P1P2, a line segment P2R2, a line segment R2R1, and a line segment R1P1. Further, the heating increased region 62 corresponding to the increase in the cooling capacity of the cooling passage 50 due to the inclined passage is formed adjacent to both sides of the heating region 61 in the circumferential direction. It is considered that the heating increased region 62 is formed on both sides of the heating region 61 in the circumferential direction so that the cooling area corresponding to the increase in cooling capacity due to the increase in the surface area of the difference DL of the passage length L2 of the cooling passage 50 is equally divided into two regions.

Specifically, the heating region 62 includes a triangular first increased region 62a surrounded by a line segment P1R1, a line segment R1Q1, and a line segment Q1P1 adjacent to one side of the heating region 61 in the circumferential direction, and a triangular second increased region 62b surrounded by a line segment P2R2, a line segment R2Q2, and a line segment Q2P2 arranged adjacent to the other side of the heating region 61 in the circumferential direction. By adding the first increased region 62a and the second increased region 62b to the heating region 61, the heating region 63 of the plate member 60 corresponding to one cooling passage 50 in Arrangement 2 is defined. That is, the region obtained by adding the heating increased region 62 to the heating region 61 having the same cooling area as that of Arrangement 1 corresponds to the heating region 63 of Arrangement 2 having the increased cooling area of the plate member 60.

By allocating the increase in the cooling capacity of the cooling passage 50 to the heating increased region 62 consisting of the first increased region 62a and the second increased region 62b as described above, the line segment R1Q1 the first increased region 62a and the line segment R2Q2 of the second increased region 62b correspond to the increase DLP in the circumferential arrangement pitch (interval) LP of the cooling passages 50 at the axial downstream end 60b in Arrangement 2.

The increase in the circumferential arrangement pitch (interval) LP of the cooling passages 50 corresponding to each of the first increased region 62a and the second increased region 62b at the axial downstream end 60b of the plate member 60 is (½)*DLP. Accordingly, the arrangement pitch LP1 of the cooling passages 50 at the axial downstream end 60b in Arrangement 2 is the sum of the arrangement pitch LP0 of Arrangement 1 and the increase DLP in the arrangement pitch LP of the heating increased region 62.

When the metal temperature of the plate member 60 at the axial downstream end 60b of the plate member 60 is kept within the allowable value and the metal temperature in the circumferential direction is kept constant in the cooling structure of the cooling passage 50 of Arrangement 1, it is considered that as described above, even in the cooling structure of the cooling passage 50 of Arrangement 2 having the cooling capacity equivalent to that of the cooling passage 50 of Arrangement 1, the metal temperature at the axial downstream end 60b of the plate member 60 is also kept within the allowable value, and the metal temperature in the circumferential direction is also kept at a substantially constant temperature.

The relationship between the inclination angle α and the cooling capacity of the cooling passage 50 when the arrangement of the cooling passages 50 is changed from Arrangement 1 to Arrangement 2 is as described above. Therefore, as the inclination angle α of the cooling passage 50 increases, the cooling capacity of the cooling passage 50 increases, the cooling area of the heating region 63 increases, and the cooling capacity of absorbing the heat input from the combustion gas G in the heating region 63 increases. In addition, as the cooling area of the heating region 63 increases due to the increase in the inclination angle α of the cooling passages 50, the circumferential arrangement pitch (interval) LP of the cooling passages 50 increases. As the inclination angle α of the cooling passage 50 increases, the length L2 of the cooling passage 50 increases, and the heat-up of the cooling air flowing through the cooling passage 50 progresses. However, even if the temperature of the cooling air flowing through the cooling passage 50 increases, the effect of increasing the cooling capacity due to the increase in the passage surface area due to the increase in the passage length is larger.

It should be noted that when Arrangement 3 (not shown) of the cooling passages 50 configured of inclined passages having a constant inclination angle α rather than Arrangement 2 of the cooling passages 50 is applied instead of Arrangement 1 of the cooling passages 50, the passage length of the cooling passage 50 is increased, and the cooling capacity of the cooling passage 50 is increased by the passage length difference DL as compare to Arrangement 1. On the other hand, the heating region 61 in Arrangement 3 is maintained as it is in Arrangement 1 without adding the increased region, and the arrangement pitch LP of the cooling passages 50 is not changed. If Arrangement 3 selects the same arrangement pitch LP0 as Arrangement 1 from the axial upstream end 60a of the plate member 60 to the axial downstream end 60b, the increase in the cooling capacity corresponding to the passage length difference DL of the cooling passage 50 becomes excessive. As a result, the plate member 60 becomes supercooled, and the excessive supply of cooling air causes a loss of the amount of cooling air, leading to a decrease in the efficiency of the gas turbine. That is, when the arrangement of the cooling passages 50 is changed from Arrangement 1 to Arrangement 3, it is desirable to reduce the amount of cooling air in accordance with the increase in cooling capacity. Therefore, when the circumferential arrangement pitch LP (interval) of the cooling passages 50 is selected and an appropriate amount of cooling air is selected so that the cooling capacity of the cooling passages 50 in the case of Arrangement 1 and the cooling capacity of the cooling passages in the case of Arrangement 2 are equivalent in terms of the cooling capacity per unit area of the plate member 60, the amount of cooling air can be reduced and the loss of the amount cooling air can be suppressed.

As described above, the arrangement of the cooling passages 50 at the first end portion 44 and the second end portion 45 shown in FIG. 5 is selected based on the concept that the inclination angle α of the cooling passage 50 when the cooling passage 50 is configured as an inclined passage and the cooling area of the heating region 63 due to the increase in the cooling capacity of the corresponding cooling passage 50 are set, and the arrangement pitch (interval) LP is set based on the set cooling area. In the case of the first end portion cooling passage 54 arranged in the first end portion 44, the arrangement of the cooling passages 50 at the axial intermediate position is selected so that the inclination angle α in the circumferential direction of the cooling passage 50 gradually increases with respect to the cooling passage 54a which is closest to the first end surface 42c and has an inclination angle [0 degrees] with respect to the axial direction. That is, an arrangement is selected such that the inclination angle α in the axial direction of the cooling passage 50 increases as it approaches from the first end surface 42c of the first body portion 42 toward the intermediate portion cooling passage 52 in the circumferential direction, the cooling area of the heating region 63 increases with the increase in the cooling capacity of the cooling passage 50, the circumferential arrangement pitch (interval) LP of the cooling passages 50 increases, and the opening density decreases.

In the case of the second end portion cooling passage 56 arranged in the second end portion 45, the arrangement of the cooling passages 50 at the axial intermediate position is selected with reference to the cooling passage 56a which is closest to the second end surface 42d and has an inclination angle [0 degrees] with respect to the axial direction. That is, an arrangement is selected such that the inclination angle α in the axial direction of the cooling passage 50 increases as it approaches from the second end surface 42d of the first body portion 42 toward the intermediate portion cooling passage 52 in the circumferential direction, the cooling area of the heating region 63 increases with the increase in the cooling capacity of the cooling passage 50, the circumferential arrangement pitch (interval) LP increases, and the opening density decreases. This point is the same concept as the first end portion cooling passage 54. However, in the case of the second end portion cooling passages 56, the circumferential arrangement pitch (interval) LP at the axial upstream end 42e where the metal temperature is low is larger than that at the axial downstream end 42f where the metal temperature is high. Therefore, the arrangement pitch (interval) LP at the axial downstream end 42f of the second end portion cooling passage 56 is the same as the arrangement pitch (interval) LP of the intermediate portion cooling passage 52 so that the metal temperature at the axial downstream end 42f of the second end portion cooling passage 56 does not exceed the allowable value.

When the arrangements of the first end portion cooling passages 54 and the second end portion cooling passages 56 are compared, the arrangement of the first end portion cooling passages 54 and the arrangement of the second end portion cooling passages 56 are substantially the same arrangement except that the arrangement pitch (interval) LP or the opening density of the cooling passages 50 changes in the opposite direction as it approaches the axial upstream side or the axial downstream side. That is, the arrangement pitch (interval) LP of the cooling passages 50 of the first end portion cooling passages 54 increases or the opening density decreases as it approaches the axial downstream side. On the other hand, the arrangement pitch (interval) LP of the cooling passages 50 of the second end portion cooling passage 56 decreases or the opening density increases as it approaches the axial downstream side. The rates of changes in the inclination angle α in the circumferential direction from the first end surface 42c or the second end surface 42d of the cooling passages 50 of the first end portion cooling passage 54 and the second end portion cooling passage 56 toward the intermediate portion 43 are substantially the same.

From another point of view, in FIG. 5, it can be considered that the arrangement of the first end portion cooling passages 54 and the arrangement of the second end portion cooling passages 56 are in an approximately symmetrical positional relationship with respect to the midpoint (intermediate point) S0 in the circumferential direction and the axial direction of the first body portion 42. That is, when an arbitrary position on the axial upstream side from the axial downstream end 42f of the n-th cooling passage 54n from the first end surface 42c of the first end portion cooling passage 54 is defined as a point S1, and an arbitrary position on the axial downstream side from the axial upstream end 42e of the same n-th cooling passage 56n from the second end surface 42d of the second end portion cooling passage 56 is defined as a point S2, if the length from the axial downstream end 42f to the point S1 and the length from the axial upstream end 42e to the point S2 are the same, it can be considered that the point S1 and the point S2 are in an approximately symmetrical positional relationship with respect to the midpoint S0. Therefore, if the numbers of cooling passages 50 arranged in the first end portion cooling passage 54 and the second end portion cooling passage 56 are the same, and the inclination angles, the arrangement pitches (intervals) LP, or the opening densities of the n-th cooling passages 54n and 56n from the first end surface 42c and the second end surface 42d are the same, the cooling areas of the heating regions 63 of each cooling passage 50 in the first end portion cooling passage 54 and the second end portion cooling passage 56 are approximately the same. In addition, the arrangement densities of the cooling passages 50 in the first end portion cooling passage 54 and the second end portion cooling passage 56 are substantially the same, and the cooling capacities are also substantially the same.

On the other hand, when the circumferential arrangement pitch LP of the cooling passages 50 at the axial upstream end 42e of the first end portion cooling passage 54 is smaller than the circumferential arrangement pitch (interval) LP of the cooling passages 50 at the axial upstream end 42e of the intermediate portion cooling passage 52, or the circumferential opening density of the cooling passages 50 at the axial upstream ends 42e of the first end portion cooling passage 54 is larger than the circumferential opening density of the cooling passages 50 at the axial upstream end 42e of the intermediate portion cooling passage 52, the arrangement density of the cooling passages 50 of the first end portion cooling passage 54 is larger than the arrangement density of the cooling passages 50 of the second end portion cooling passage 56. In addition, when the circumferential arrangement pitch (interval) LP or the circumferential opening densities of the n-th cooling passages 54n from the first end surface 42c of the first end portion cooling passage 54 and the n-th cooling passages 56n from the second end surface 42d of the second end portion cooling passage 56 are compared, the cooling passages 50 of the first end portion cooling passage 54 have a smaller circumferential arrangement pitch (interval) LP and a smaller circumferential opening density than those of the cooling passages 50 of the second end portion cooling passage 56. That is, the cooling passages 50 in the first body portion 42 of the first end portion cooling passage 54 have a larger arrangement density and a larger cooling capacity than those of the second end portion cooling passage 56. Further, if the inclination angle α of the n-th cooling passage 56n from the second end surface 42d of the second end portion cooling passage 56 is larger than the inclination angle α of the n-th cooling passage 54n from the first end surface 42c of the first end portion cooling passage 54, the arrangement density of the cooling passages 50 of the first end portion cooling passages 54 will be even larger than the arrangement density of the cooling passages 50 of the second end portion cooling passages 56. In this manner, it may be better to select an arrangement in which the circumferential arrangement pitches LP, the circumferential opening density or the inclination angle α of the cooling passages 50 are different with respect to the midpoint S0 of the first body portion 42 while selecting an arrangement that is symmetrical with respect to the midpoint S0 as the arrangements of the first end portion cooling passage 54 and the second end portion cooling passage 56. The reasons therefor are as follows.

The cooling passages 50 of the first end portion cooling passage 54 and the second end portion cooling passage 56 are heated up by the heat input from the combustion gas G as it approaches the axial downstream side and the plate member 60 is heated. In addition, the circumferential arrangement pitch LP and the opening density of the cooling passages 50 of the first end portion cooling passage 54 increases and decreases, respectively, as it approaches the axial downstream side. On the other hand, the circumferential arrangement pitch LP and the opening density of the cooling passages 50 of the second end portion cooling passage 56 decreases and increases, respectively, as it approaches the axial downstream side. That is, the degree of heat-up in the first end portion cooling passage 54 is higher than that in the second end portion cooling passage 56, and the metal temperature at the axial downstream end 42f in the first end portion cooling passage 54 is higher than that in the second end portion cooling passage 56. In order to deal with this, the cooling passages 50 in the first end portion cooling passage 54 are arranged such that the circumferential arrangement pitch LP of the cooling passages 50 is smaller, the opening density is larger, or the inclination angle α is smaller than that of the arrangement of the cooling passages 50 of the second end portion cooling passage 56, thereby enhancing the cooling capacity of the first end portion cooling passage 54. However, when the first end portion cooling passage 54 and the intermediate portion cooling passage 52 are compared, the circumferential arrangement pitch LP of the cooling passages 50 at the axial intermediate position of the first end portion cooling passage 54 is larger and the opening density is smaller than the circumferential arrangement pitch LP and the opening density at the same axial intermediate position of the intermediate portion cooling passage 52. In addition, the inclination angle α of the cooling passages 50 in the first end portion cooling passage 54 is smaller than that in the intermediate portion cooling passage 52. Thus, the cooling capacity of the cooling passages 50 of the intermediate portion cooling passage 52 is larger than that of the first end portion cooling passage 54 and the second end portion cooling passage 56.

Although the above description relates to the inner sealing member 40a, the same structure and arrangement of the cooling passages 50 can be applied to the outer sealing member 40b. However, in the case of the outer sealing member 40b, in the description of the inner sealing member 40a, "radial outer side" should be read "radial inner side", and "radial inner side" should be read as "radial outer side".

<<Features of Cooling Passage>>

Features of the arrangement of the cooling passages 50 of the sealing member 40 will be described below.

A first feature is that all the cooling passages 50 except for the cooling passages 54a and 56a arranged adjacent to the first end surface 42c and the second end surface 42d on both sides in the circumferential direction of the first body portion 42 are configured as inclined passages having an inclination angle α with respect to the axial direction. Furthermore, the cooling passages 50 arranged in the first body portion 42 are arranged differently such that the arrangement of the cooling passages 50 in the intermediate portion 43 in the circumferential direction of the first body portion 42, the arrangement of the cooling passages 50 in the first end portion 44 on the first end surface 42c side with the intermediate portion 43 interposed, and the arrangement of the cooling passages 50 in the second end portion 45 on the second end surface 43d side are different.

That is, in all the cooling passages 50 arranged in the intermediate portion 43, the inclination angle α is larger than that of the cooling passages 50 arranged in the first end portion 44 and the second end portion 45, the passage length from the axial upstream end 42e to the axial downstream end 42f is the largest, and the cooling passages 50 are longer than the cooling passages 50 of the first end portion cooling passage 54 and the second end portion cooling passage 56. All the cooling passages 50 of the intermediate portion cooling passages 52 are parallel to each other, and have a cooling structure in which compared to the first end portion cooling passages 54 and the second end portion cooling passages 56, the circumferential arrangement pitch (interval) LP is the largest, and the opening density of the cooling passages 50 is the largest.

A second feature is that the arrangements of the cooling passages 50 in the first end portion cooling passages 54 and the second end portion cooling passages 56 are different. As described above, the first end portion cooling passage 54 has an arrangement in which the inclination angle α with respect to the axial direction of the cooling passages 50 increases, the circumferential arrangement pitch (interval) LP of the cooling passages 50 at the axial intermediate position increases, and the opening density decreases as it approaches from the first end surface 42c side toward the second end surface 42d side on the opposite side in the circumferential direction. In this manner, by selecting an arrangement in which the inclination angle α of the cooling passage 50 increases as it departs from the first end surface 42c, the cooling capacity of the cooling passage 50 can be increased, the heating region 61 can be increased, the metal temperature of the first end portion 44 at the axial downstream end 42f of the cooling passage 50 of the first end portion cooling passage 54 can be kept at an appropriate temperature of the allowable value or lower, whereby heat damage due to the heat input from the combustion gas G can be suppressed.

On the other hand, the second end portion cooling passage 56 has an arrangement in which the inclination angle α with respect to the axial direction of the cooling passages 50 increases, the circumferential arrangement pitch (interval) LP of the cooling passages 50 increases, and the opening density decreases as it approaches from the second end surface 42d side toward the first end surface 42c side on the opposite side in the circumferential direction. However, the change in the arrangement pitch (interval) LP or the opening density in the axial direction of the cooling passages 50 is opposite to that of the first end portion cooling passage 54.

That is, in the second end portion cooling passage 56, the circumferential arrangement pitch (interval) LP decreases and the opening density increases as it approaches the axial downstream side of the cooling passages 50, and at the axial downstream end 42f, the arrangement pitch LP and the opening density are the same as those of the cooling passages 50 of the intermediate portion cooling passage 52. By selecting such an arrangement, similarly to the first end portion 44, heat damage due to the heat input from the combustion gas G can be suppressed while maintaining the metal temperature of the first end portion 44 at the axial downstream end 42f of the cooling passage 50 of the second end portion cooling passage 56 at an appropriate temperature of the allowable value or lower.

In addition, both the first end portion cooling passage 54 and the second end portion cooling passage 56 have a smaller surface area per unit area of the first body portion 42 (the plate member 60) than the intermediate portion cooling passage 52.

However, in the first end portion cooling passage 54 and the second end portion cooling passage 56, the heat load from the combustion gas G is smaller than that of the intermediate portion cooling passage 52, and the allowable metal temperature can be set higher. Thus, the amount of cooling air can be reduced while maintaining the metal temperature of the first body portion 42 at the axial downstream end 42f within the allowable value. Next, modification examples of the arrangement of the cooling passages 50 arranged in the first body portion 42 of the sealing member 40 will be described below.

Modification Example

Figure 8:
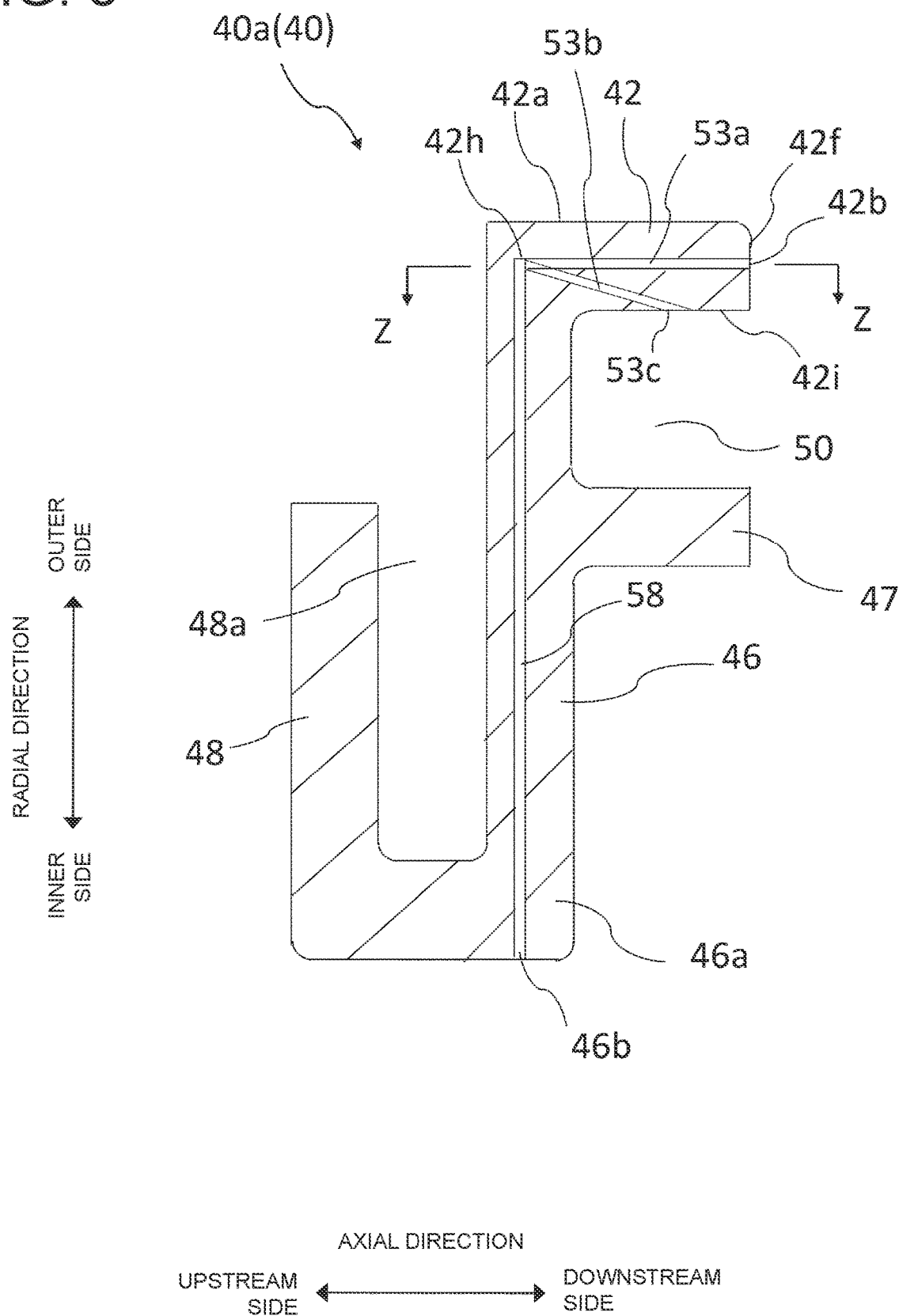
FIG. 8 is a configuration diagram showing a modification example of the sealing member.
Figure 9:
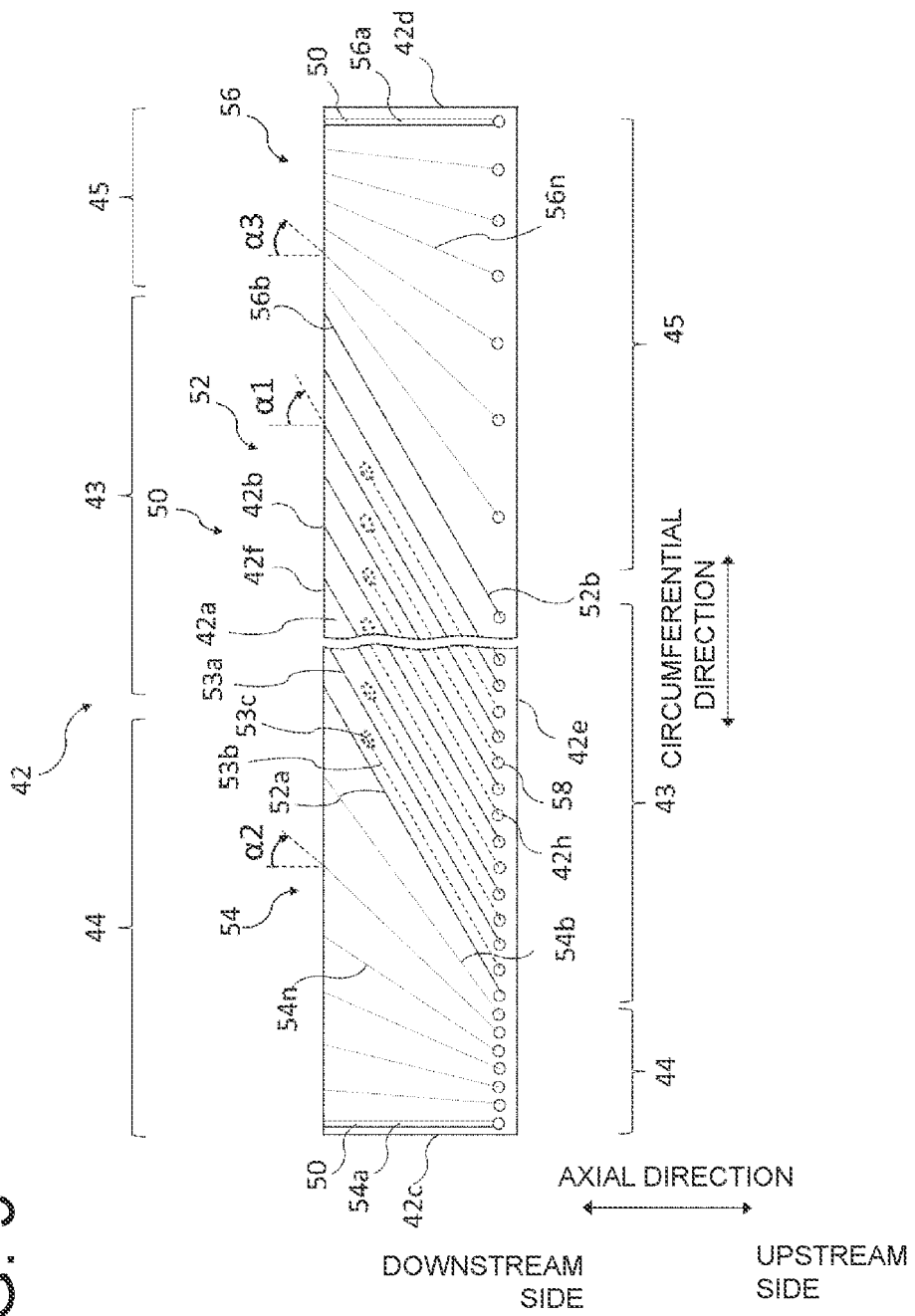
FIG. 9 is a layout diagram of cooling passages in a modification example of the sealing member, showing a Z-Z cross-section of FIG. 8.

FIG. 8 is a configuration diagram of a modification example of the sealing member, and FIG. 9 is a layout diagram of cooling passages of the modification example of the sealing member, showing a Z-Z cross-section in FIG. 8. FIG. 10 is a combined structural diagram of a modification example of the sealing member and a turbine stator blade. As shown in FIGS. 8 and 9, the arrangement of the cooling passages 50 of the sealing member 40 of this modification example in the intermediate portion cooling passage 52 is different from that of the embodiment. Other structures are the same as the embodiment, including the arrangements of the first end portion cooling passage 54 and the second end portion cooling passage 56.

As shown in FIGS. 8 and 9, the intermediate portion cooling passage 52 in this modification example includes a first intermediate portion cooling passage 53a that opens to an axial downstream end 42f of the first body portion 42, and a second intermediate portion cooling passage 53b that opens to an inner surface 42i on the radial inner side of the first body portion 42. As shown in FIG. 9, when the intermediate portion cooling passage 52 of this modification example is viewed from the radial outer side, the first intermediate portion cooling passage 53a and the second intermediate portion cooling passage 53b are arranged alternately in the circumferential direction and are arranged parallel to each other. However, the first intermediate portion cooling passage 53a and the second intermediate portion cooling passage 53b are similar to the cooling passages 50 of the intermediate portion cooling passage 52 of the present embodiment in terms of the circumferential arrangement pitch (interval) LP, the inclination angle α in the axial direction, and the opening density.

Similarly to the cooling passage 50 of the intermediate portion cooling passage 52 of the embodiment, the first intermediate portion cooling passage 53a is an inclined passage with an inclination angle α with respect to the axial direction, and is open to the axial downstream end 42f of the first body portion 42. On the other hand, the second intermediate portion cooling passage 53b is an inclined passage that has an inclination angle α with respect to the axial direction and is also inclined in the radial direction and is open to the opening 53c formed in the inner surface 42i of the first body portion 42.

As shown in FIG. 10, similarly to the sealing member 40 shown in the embodiment, in the sealing member 40 of this modification example, a recess portion 50 that is recessed toward the axial upstream side from the axial downstream end 42f is formed in the first body portion 42 between the first body portion 42 and the third body portion 47. The turbine stator blade 24 arranged adjacent to the axial downstream side has a protruding portion 25a protruding from the front edge 24a side of the shroud 25 toward the axial upstream side. The protruding portion 25a of the shroud 25 is inserted into the recess portion 50 of the sealing member 40 from the axial downstream side, and the sealing member 40 and the turbine stator blade 24 are fitted. A predetermined gap is provided in the axial direction between the sealing member 40 and the turbine stator blade 24 in order to absorb the difference in thermal expansion in the axial direction between the sealing member 40 and the turbine stator blade 40 that occurs during the operation of the gas turbine 1. On the other hand, a fixed seal 49 is arranged between the third body portion 47 and the protruding portions 25a to seal a gap 70 between the sealing member 40 and the turbine stator blade 24 and the space 21 of the casing 20 so that the cooling air (compressed air A) in the space 21 of the casing 20 does not flow into the combustion gas G from the gap 70 between the sealing member 40 and the turbine stator blade 24.

However, due to pressure fluctuations in the combustion gas G flowing through the combustion gas flow path 37, a portion of the high-temperature combustion gas G may be caught in the gap 70 between the first body portion 42 of the sealing member 40 and the protruding portion 25a of the turbine stator blade 24, and the first body portion 42 and the protruding portion 25a of the sealing member 40 may be thermally damaged. According to the intermediate portion cooling passage 52 of the sealing member 40 shown in the modification example described above, the first intermediate portion cooling passage 53a forming the intermediate portion cooling passage 52 can cool the gas path surface on the outer surface 42a side of the first body portion 42 by discharging the cooling air from the opening 42b at the axial downstream end 42f of the first body portion 42. On the other hand, the second intermediate portion cooling passage 53b discharges the cooling air toward the gap 70 from the gap 70 formed on the radial inner side of the first body portion 42 whereby the combustion gas G caught in the gap 70 can be purged toward the combustion gas flow path 37 side, the ambient gas temperature in the gap 70 can be lowered, and the inner surface 42i of the first body portion 42 can be cooled. Therefore, according to the intermediate portion cooling passage 52 shown in this modification example, the gas path surface and the inner surface 42i of the first body portion 42 can be uniformly cooled, and the heat damage to the sealing member 40 and the protruding portion 25a of the turbine stator blade 24 is suppressed.

It is intended, however, that unless particularly specified, dimensions, materials, shapes, relative positions and the like of components described in the embodiments and modification examples shall be interpreted as illustrative only and not intended to limit the scope of the present invention. For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function. For instance, an expression of an equal state such as "same" "equal" and "homogenous" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved. On the other hand, expressions such as "comprise", "include", "have", "contain" and "constitute" are not intended to be exclusive of other components.

The contents described in the embodiments and modification examples described above are understood as follows.

(1) A sealing member according to a first aspect is a sealing member that forms a combustion gas flow path of a gas turbine, the sealing member including: a first body portion extending in an axial direction and a circumferential direction and having a cooling passage therein, wherein the first body portion includes: a first end portion that forms one end portion in the circumferential direction; a second end portion that forms the other end portion on an opposite side in the circumferential direction; and an intermediate portion formed between the first end portion and the second end portion, the cooling passage includes: a plurality of intermediate portion cooling passages arranged in the intermediate portion, inclined at a first angle with respect to the axial direction, extending in the axial direction, and arranged in the circumferential direction; a first end portion cooling passage arranged in the first end portion, inclined at a second angle with respect to the axial direction, extending in the axial direction, and arranged in the circumferential direction; and a plurality of second end portion cooling passages arranged in the second end portion, inclined at a third angle with respect to the axial direction, extending in the axial direction, and arranged in the circumferential direction, and the second angle and the third angle are smaller than the first angle.

According to the sealing member described in (1) above, the second angle of the first end portion cooling passage and the third angle of the second end portion cooling passage are smaller than the first angle of the intermediate portion cooling passage. Therefore, the cooling area of the intermediate portion cooling passage in the high-temperature region is increased, and the metal temperature of the intermediate portion of the first body portion can be suppressed to the allowable value or lower.

(2) A sealing member according to a second aspect is a sealing member that forms a combustion gas flow path of a gas turbine, the sealing member including: a first body portion extending in an axial direction and a circumferential direction and having a cooling passage therein, wherein the first body portion includes: a first end portion that forms one end portion in the circumferential direction; a second end portion that forms the other end portion on an opposite side in the circumferential direction; and an intermediate portion formed between the first end portion and the second end portion, the cooling passage includes: a plurality of intermediate portion cooling passages arranged in the intermediate portion, extending with a certain inclination with respect to the axial direction, and arranged in the circumferential direction; a plurality of first end portion cooling passages arranged in the first end portion, extending with a predetermined inclination with respect to the axial direction, and arranged in the circumferential direction; and a plurality of second end portion cooling passages arranged in the second end portion, extending with a predetermined inclination with respect to the axial direction, and arranged in the circumferential direction, and in either one of the first end portion cooling passage or the second end portion cooling passage, an opening density of the cooling passage at an axial upstream end is smaller than the opening density of the cooling passage at an axial downstream end.

According to the sealing member described in (2) above, the opening density of the cooling passage at the axial upstream end of one of the first end portion cooling passage and the second end portion cooling passage is larger than that at the axial downstream end. Therefore, the cooling area in the intermediate portion in the high-temperature region is increased to suppress the metal temperature in the intermediate portion. Moreover, the opening density on the axial upstream side of the first end portion or the second end portion where the allowable metal temperature is high is smaller than that on the axial downstream side to reduce the cooling area and reduce the amount of cooling air. Therefore, the amount of cooling air can be reduced while suppressing the metal temperature of the first body portion within the allowable value.

(3) A sealing member according to a third aspect is a sealing member that forms a combustion gas flow path of a gas turbine, the sealing member including: a first body portion extending in an axial direction and a circumferential direction and having a cooling passage therein, wherein the first body portion includes: a first end portion that forms one end portion in the circumferential direction; a second end portion that forms the other end portion on an opposite side in the circumferential direction; and an intermediate portion formed between the first end portion and the second end portion, the cooling passage includes: a plurality of intermediate portion cooling passages arranged in the intermediate portion, extending with a certain inclination with respect to the axial direction, and arranged in the circumferential direction; a plurality of first end portion cooling passages arranged in the first end portion, extending with a predetermined inclination with respect to the axial direction, and arranged in the circumferential direction; and a plurality of second end portion cooling passages arranged in the second end portion, extending with a predetermined inclination with respect to the axial direction, and arranged in the circumferential direction, and in either one of the first end portion cooling passage or the second end portion cooling passage, an arrangement pitch of the cooling passages at an axial upstream end is larger than the arrangement pitch of the cooling passages at an axial downstream end.

According to the sealing member described in (3) above, the arrangement pitch at the axial upstream end of one of the first end portion cooling passage and the second end portion cooling passage is larger than that at the axial downstream end. Therefore, the cooling area of the intermediate portion in the high-temperature region is increased to suppress the metal temperature in the intermediate portion. Moreover, the arrangement pitch on the axial upstream side of the first end portion or the second end portion where the allowable metal temperature is high is smaller than that on the axial downstream side to reduce the cooling area and reduce the amount of cooling air.

Therefore, the amount of cooling air can be reduced while suppressing the metal temperature of the first body portion within the allowable value.

(4) A sealing member according to a fourth aspect is the sealing member of (1), in which at least one of the second angle of the first end portion cooling passage or the third angle of the second end portion cooling passage increases as it departs from an adjacent end surface of the first body portion in the circumferential direction.

According to the sealing member described in (4) above, the angle of the cooling passage of one of the second angle of the first end portion cooling passage and the third angle of the second end portion cooling passage increases as it departs from the end surface of the first body portion. The cooling area of the cooling passage of the corresponding end portion decreases, and the amount of cooling air decreases.

(5) A sealing member according to a fifth aspect is the sealing member of (4), in which the second angle of the first end portion cooling passage increases as it departs from a first end surface of the first body portion in the circumferential direction, and the third angle of the second end portion cooling passage increases as it departs from a second end surface of the first body portion in the circumferential direction.

According to the sealing member described in (5) above, the second angle of the first end portion cooling passage and the third angle of the second end portion cooling passage increase as it departs from the end surface of the first body portion. Therefore, the cooling area of the cooling passage of the first end portion and the second end portion decreases, and the amount of outside air is further reduced.

(6) A sealing member according to a sixth aspect is the sealing member of (2), in which the opening density of the cooling passage of at least one of the first end portion cooling passage or the second end portion cooling passage increase as it approaches an axial downstream side.

According to the sealing member described in (6) above, the opening density of the end portion cooling passage of at least one of the first end portion or the second end portion where the allowable metal temperature is higher than that of the intermediate portion increases as it approaches the axial downstream side. Therefore, the metal temperature at the axial downstream end can be kept within the allowable range. Moreover, since the opening density of the cooling passage in the axial direction is changed, the cooling area is smaller than that of the axial intermediate portion, and the amount of cooling air can be reduced.

(7) A sealing member according to a seventh aspect is the sealing member of (2) or (6), in which the opening density of the first end portion cooling passage decreases as it approaches an axial downstream side, and the opening density of the second end portion cooling passage increases as it approaches an axial downstream side.

According to the sealing member described in (7) above, the allowable metal temperature of the first end portion and the second end portion can be made higher than that of the intermediate portion. In addition, since the opening density of the first end portion cooling passage and the second end portion cooling passage changes as it approaches the axial downstream side, the cooling area becomes smaller than that in the intermediate portion, and the amount of cooling air can be reduced. Furthermore, since the opening density of the second end portion cooling passage increases as it approaches the axial downstream side, the metal temperature at the axial downstream end of the second end portion can be kept within the allowable value.

(8) A sealing member according to an eighth aspect is the sealing member of any one of (2), (6), and (7), in which the opening density at an axial intermediate position of the cooling passage of at least one of the first end portion cooling passage or the second end portion cooling passage decreases as it departs from an adjacent end surface of the first body portion in the circumferential direction.

According to the sealing member described in (8) above, since the opening density at the axial intermediate position of at least one of the first end portion cooling passage or the second end portion cooling passage decreases as it departs from the end surface adjacent to the first body portion, the amount of cooling air is reduced.

(9) A sealing member according to a ninth aspect is the sealing member according to any one of (2) and (6) to (8), in which the opening density of the cooling passage at an axial intermediate position of the first end portion cooling passage decreases as it departs from a first adjacent end surface, adjacent in the circumferential direction, of the first body portion in the circumferential direction, and the opening density of the cooling passage at an axial intermediate position of the second end portion cooling passage decreases as it departs from a second adjacent end surface of the first body portion in the circumferential direction.

According to the sealing member described in (9) above, the opening density at the axial intermediate position of the first end portion cooling passage and the second end portion cooling passage decreases as it departs from the first end surface and the second end surface adjacent to the first body portion, the amount of cooling air is further reduced.

(10) A sealing member according to a tenth aspect is the sealing member according to any one of (2) and (6) to (9), in which the opening density in the circumferential direction at an axial intermediate position of the intermediate portion cooling passage is larger than the opening density in the circumferential direction at the same axial intermediate position of the first end portion cooling passage, and the opening density in the circumferential direction at the same axial intermediate position of the first end portion cooling passage is larger than the opening density in the circumferential direction at the same axial intermediate position of the second end portion cooling passage.

According to the sealing member described in (10) above, the opening density of the intermediate portion cooling passages is higher than that of the first end portion cooling passages, and the opening density of the first end portion cooling passage is higher than that of the second end portion cooling passages, so that the cooling capacity of the first end portion cooling passage and the second end portion cooling passage is smaller than that of the intermediate portion where the cooling capacity is the largest. Therefore, the amount of cooling air of the sealing member as a whole is reduced. In addition, the opening density of the first end portion cooling passage is higher than the opening density of the second end portion cooling passage to suppress the metal temperature of the first end portion within an allowable value.

(11) A sealing member according to an eleventh aspect is the sealing member of (3), in which the arrangement pitch at an axial intermediate position of the cooling passage of at least one of the first end portion cooling passage or the second end portion cooling passage increases as it departs from an adjacent end surface of the first body portion in the circumferential direction.

According to the sealing member described in (11) above, the arrangement pitch at the axial intermediate position of the cooling passage of at least one of the first end portion cooling passage or the second end portion cooling passage decreases as it departs from the end surface of the first body portion, the cooling area increases, and the amount of cooling air is reduced.

(12) A sealing member according to a twelfth aspect is the sealing member of (3) or (11), in which in the first end portion cooling passage, the arrangement pitch of the cooling passages increases from an axial upstream side toward an axial downstream side, and in the second end portion cooling passage, the arrangement pitch of the cooling passages decreases from an axial upstream side toward an axial downstream side.

According to the sealing member described in (12) above, the arrangement pitch of the first end portion cooling passage increases as it approaches the axial downstream side, and the arrangement pitch of the second end portion cooling passage decreases as it approaches the axial downstream side. Therefore, the metal temperature at the axial downstream end can be suppressed to an allowable value or less, and the amount of cooling air can be reduced.

(13) A sealing member according to a thirteenth aspect is the sealing member of any one of (3), (11), and (12), in which the arrangement pitch at an axial intermediate position of the cooling passage of the intermediate portion cooling passage is smaller than the arrangement pitch at the same axial intermediate position of the first end portion cooling passage and the second end portion cooling passage.

According to the sealing member described in (13) above, since the arrangement pitch of the intermediate portion cooling passage is smaller and the cooling area is large than those of other regions, it is possible to prevent heat damage at the axial downstream end of the intermediate portion.

(14) A sealing member according to a fourteenth aspect is the sealing member of any one of (3) and (11) to (13), in which in the intermediate portion cooling passage, the arrangement pitch at an axial upstream end of the cooling passages is the same as the arrangement pitch at an axial downstream end, the first end portion cooling passage is formed so that the arrangement pitch at an axial upstream end of the cooling passages is smaller than the arrangement pitch at an axial upstream end of the intermediate portion cooling passages, and the arrangement pitch at the axial downstream end is larger than the arrangement pitch at the axial downstream end of the intermediate portion cooling passages, and the second end portion cooling passage is formed so that the arrangement pitch at an axial upstream end of the cooling passages is larger than the arrangement pitch at an axial upstream end of the intermediate portion cooling passages, and the arrangement pitch at the axial downstream end is the same as the arrangement pitch at the axial downstream end of the intermediate portion cooling passages.

According to the sealing member described in (14) above, the metal temperature at the axial downstream end of the first body portion is suppressed within an allowable value, and the amount of cooling air of the sealing member as a whole is reduced.

(15) A sealing member according to a fifteenth aspect is the sealing member of any one of (1) to (14), in which a circumferential width at an axial upstream end of the intermediate portion in which the intermediate portion cooling passage is formed is the same as a circumferential width at an axial downstream end, a circumferential width at an axial upstream end of the first end portion in which the first end portion cooling passage is formed is smaller than a circumferential width at an axial downstream end, and a circumferential width at an axial upstream end of the second end portion in which the second end portion cooling passage is formed is larger than a circumferential width at an axial downstream end.

According to the sealing member described in (15) above, the first end portion in which the first end portion cooling passage is formed and the second end portion in which the second end portion cooling passage is formed have a smaller surface area of the cooling passage per unit area and a smaller cooling area than the intermediate portion in which the intermediate portion cooling passage is formed. Therefore, the amount of cooling air in the first end portion and the second end portion is reduced as compared to the intermediate portion, and the amount of cooling air of the sealing member as a whole is reduced.

(16) A sealing member according to a sixteenth aspect is the sealing member of any one of (1) to (15), in which the circumferential width at an axial upstream end between the end surfaces on both sides in the circumferential direction of the first body portion is the same as or larger than the circumferential width of the first body portion at least at an axial downstream end.

(17) A sealing member according to a seventeenth aspect is the sealing member of any one of (1) to (16), in which the intermediate portion cooling passage includes a plurality of cooling passages inclined in a radial inward direction as it advances toward an axial downstream side and open to an inner surface on a radial inner side of the first body portion.

According to the sealing member described in (17) above, since the combustion gas caught in the recess portion is immediately purged into the combustion gas flow path by the cooling air discharged from the cooling passage, the heat damage to the sealing member is suppressed.

(18) A sealing member according to an eighteenth aspect is the sealing member of (17), in which the intermediate portion cooling passage includes: a first intermediate portion cooling passage open to an axial downstream end of the first body portion; and a second intermediate portion cooling passage open to the inner surface on the radial inner side of the first body portion, and the first intermediate portion cooling passage and the second intermediate portion cooling passage are alternately arranged in the circumferential direction of the first body portion.

According to the sealing member described in (18) above, since the first intermediate portion cooling passage and the second intermediate portion cooling passage forming the cooling passages are alternately arranged in the circumferential direction, the intermediate portion of the first body portion with a large heat load is uniformly cooled.

(19) A sealing member according to a nineteenth aspect is the sealing member of any one of (1) to (18), in which the sealing member is a sealing member arranged between a transition piece that discharges combustion gas and a stator blade on an axial downstream side of the transition piece to seal a space between the transition piece and the stator blade, the sealing member including: the first body portion; and a second body portion connected to an axial upstream end of the first body portion, extending in a direction away from an outer surface, and having an outer terminal end engaged with the transition piece, the second body portion includes a supply passage extending in a radial direction therein, and a plurality of the supply passages are arranged in the circumferential direction, each of which communicates with the cooling passage at one end, and communicates with a space surrounded by a casing through an opening formed at the other end, which is the terminal end of the second body portion.

(20) A gas turbine according to a twentieth aspect includes the sealing member according to any one of (1) to (19), a combustor connected to an axial upstream side of the sealing member; and a turbine driven by combustion gas generated by the combustor.

REFERENCE SIGNS LIST

1 Gas turbine
2 Compressor
4 Combustor
6 Turbine
8 Rotor
10 Compressor casing
12 Intake chamber
14 Inlet guide blade
16 Compressor stator blade
18 Compressor rotor blade
20 Casing
21 Space
22 Turbine casing
24 Turbine stator blade
25 Shroud
25a Protruding portion
26 Turbine rotor blade
28 Exhaust casing
29 Exhaust chamber
30 Combustion nozzle
32 Combustion cylinder
33 Combustion basket
34 Transition piece
35 Flange
37 Combustion gas flow path
40 Sealing member
40a Inner sealing member
40b Outer sealing member
42 First body portion
42a Outer surface
42b Opening
42c First end surface
42d Second end surface
42e Axial upstream end
42f Axial downstream end
42h Connection point
42i Inner surface
43 Intermediate portion
44 First end portion
45 Second end portion
46 Second body portion
46a End portion
46b Opening
47 Third body portion
48 Fitting portion
49 Fixed seal
50, 52a, 52b, 53a, 53b. 54a, 54n, 56a, 56n Cooling passage
50a Central axis
52 Intermediate portion cooling passage
53a First intermediate portion cooling passage
53b Second intermediate portion cooling passage
53c Opening
54 First end portion cooling passage
56 Second end portion cooling passage
58 Supply passage
60 Plate member
60a Axial upstream end
60b Axial downstream end
61, 63 Heating region
62 Heating increased region
62a First increased region
62b Second increased region
L1, L2 Passage length
DL Difference
α, α0 Inclination angle
α1 Inclination angle (first angle)
α2 Inclination angle (second angle)
α3 Inclination angle (third angle)
LP, LP0, LP1 Arrangement pitch

The invention claimed is:

1. A sealing member that forms a combustion gas flow path of a gas turbine, the seal member being configured to seal a gap between the a transition piece of a combustor and a shroud of a turbine stator blade, the sealing member comprising:
a first body portion extending in an axial direction and a circumferential direction and having a cooling passage therein, wherein
the first body portion includes:
a first end portion that forms one end portion in the circumferential direction;
a second end portion that forms the other end portion on an opposite side in the circumferential direction; and
an intermediate portion formed between the first end portion and the second end portion, the cooling passage includes:
a plurality of intermediate portion cooling passages arranged in the intermediate portion, inclined at a first angle with respect to the axial direction, extending in the axial direction, and arranged in the circumferential direction;
a first end portion cooling passage arranged in the first end portion, inclined at a second angle with respect to the axial direction, extending in the axial direction, and arranged in the circumferential direction; and
a plurality of second end portion cooling passages arranged in the second end portion, inclined at a third angle with respect to the axial direction, extending in the axial direction, and arranged in the circumferential direction, and
the second angle and the third angle are smaller than the first angle.

2. The sealing member according to claim 1, wherein
at least one of the second angle of the first end portion cooling passage or the third angle of the second end portion cooling passage increases as it departs from an adjacent end surface of the first body portion in the circumferential direction.

3. The sealing member according to claim 2, wherein
the second angle of the first end portion cooling passage increases as it departs from a first end surface of the first body portion in the circumferential direction, and
the third angle of the second end portion cooling passage increases as it departs from a second end surface of the first body portion in the circumferential direction.

4. The sealing member according to claim 1, wherein
a circumferential width at an axial upstream end of the intermediate portion in which the intermediate portion cooling passage is formed is the same as a circumferential width at an axial downstream end,
a circumferential width at an axial upstream end of the first end portion in which the first end portion cooling passage is formed is smaller than a circumferential width at an axial downstream end, and
a circumferential width at an axial upstream end of the second end portion in which the second end portion cooling passage is formed is larger than a circumferential width at an axial downstream end.

5. The sealing member according to claim 1, wherein
the circumferential width at an axial upstream end between the end surfaces on both sides in the circumferential direction of the first body portion is the same as or larger than the circumferential width of the first body portion at least at an axial downstream end.

6. The sealing member according to claim 1, wherein
the intermediate portion cooling passage includes a plurality of cooling passages inclined in a radial inward direction as it advances toward an axial downstream side and open to an inner surface on a radial inner side of the first body portion.

7. The sealing member according to claim 6, wherein
the intermediate portion cooling passage includes:
a first intermediate portion cooling passage open to an axial downstream end of the first body portion; and
a second intermediate portion cooling passage open to the inner surface on the radial inner side of the first body portion, and
the first intermediate portion cooling passage and the second intermediate portion cooling passage are alternately arranged in the circumferential direction of the first body portion.

8. The sealing member according to claim 1, wherein
the sealing member is a sealing member arranged between a transition piece that discharges combustion gas and a stator blade on an axial downstream side of the transition piece to seal a space between the transition piece and the stator blade, the sealing member including:
the first body portion; and
a second body portion connected to an axial upstream end of the first body portion, extending in a direction away from an outer surface, and having an outer terminal end engaged with the transition piece,
the second body portion includes a supply passage extending in a radial direction therein, and
a plurality of the supply passages are arranged in the circumferential direction, each of which communicates with the cooling passage at one end, and communicates with a space surrounded by a casing through an opening formed at the other end, which is the terminal end of the second body portion.

9. A gas turbine comprising:
the sealing member according to claim 1;
a combustor connected to an axial upstream side of the sealing member; and
a turbine driven by combustion gas generated by the combustor.

10. A sealing member that forms a combustion gas flow path of a gas turbine, the seal member being configured to seal a gap between the a transition piece of a combustor and a shroud of a turbine stator blade, the sealing member comprising:
a first body portion extending in an axial direction and a circumferential direction and having a cooling passage therein, wherein
the first body portion includes:
a first end portion that forms one end portion in the circumferential direction;
a second end portion that forms the other end portion on an opposite side in the circumferential direction; and
an intermediate portion formed between the first end portion and the second end portion,
the cooling passage includes:
a plurality of intermediate portion cooling passages arranged in the intermediate portion, extending with a certain inclination with respect to the axial direction, and arranged in the circumferential direction;
a plurality of first end portion cooling passages arranged in the first end portion, extending with a predetermined inclination with respect to the axial direction, and arranged in the circumferential direction; and
a plurality of second end portion cooling passages arranged in the second end portion, extending with a predetermined inclination with respect to the axial direction, and arranged in the circumferential direction, and
in either one of the first end portion cooling passage or the second end portion cooling passage, an opening density of the cooling passage at an axial upstream end is smaller than the opening density of the cooling passage at an axial downstream end.

11. The sealing member according to claim 10, wherein
the opening density of the cooling passage of at least one of the first end portion cooling passage or the second end portion cooling passage increases as it approaches an axial downstream side.

12. The sealing member according to claim 10, wherein
the opening density of the first end portion cooling passage decreases as it approaches an axial downstream side, and
the opening density of the second end portion cooling passage increases as it approaches an axial downstream side.

13. The sealing member according to claim 10, wherein
the opening density at an axial intermediate position of the cooling passage of at least one of the first end portion cooling passage or the second end portion cooling passage decreases as it departs from an adjacent end surface of the first body portion in the circumferential direction.

14. The sealing member according to claim 10, wherein
the opening density of the cooling passage at an axial intermediate position of the first end portion cooling passage decreases as it departs from a first adjacent end surface, adjacent in the circumferential direction, of the first body portion in the circumferential direction, and
the opening density of the cooling passage at an axial intermediate position of the second end portion cooling passage decreases as it departs from a second adjacent end surface of the first body portion in the circumferential direction.

15. The sealing member according to claim 10, wherein
the opening density in the circumferential direction at an axial intermediate position of the intermediate portion cooling passage is larger than the opening density in the circumferential direction at the same axial intermediate position of the first end portion cooling passage, and
the opening density in the circumferential direction at the same axial intermediate position of the first end portion cooling passage is larger than the opening density in the circumferential direction at the same axial intermediate position of the second end portion cooling passage.

16. A sealing member that forms a combustion gas flow path of a gas turbine, the seal member being configured to seal a gap between the a transition piece of a combustor and a shroud of a turbine stator blade, the sealing member comprising:
a first body portion extending in an axial direction and a circumferential direction and having a cooling passage therein, wherein
the first body portion includes:
a first end portion that forms one end portion in the circumferential direction;
a second end portion that forms the other end portion on an opposite side in the circumferential direction; and
an intermediate portion formed between the first end portion and the second end portion, the cooling passage includes:
a plurality of intermediate portion cooling passages arranged in the intermediate portion, extending with a certain inclination with respect to the axial direction, and arranged in the circumferential direction;
a plurality of first end portion cooling passages arranged in the first end portion, extending with a predetermined inclination with respect to the axial direction, and arranged in the circumferential direction; and
a plurality of second end portion cooling passages arranged in the second end portion, extending with a predetermined inclination with respect to the axial direction, and arranged in the circumferential direction, and
in either one of the first end portion cooling passage or the second end portion cooling passage, an arrangement pitch of the cooling passages at an axial upstream end is larger than the arrangement pitch of the cooling passages at an axial downstream end.

17. The sealing member according to claim 16, wherein the arrangement pitch at an axial intermediate position of the cooling passage of at least one of the first end portion cooling passage or the second end portion cooling passage increases as it departs from an adjacent end surface of the first body portion in the circumferential direction.

18. The sealing member according to claim 16, wherein
in the first end portion cooling passage, the arrangement pitch of the cooling passages increases from an axial upstream side toward an axial downstream side, and
in the second end portion cooling passage, the arrangement pitch of the cooling passages decreases from an axial upstream side toward an axial downstream side.

19. The sealing member according to claim 16, wherein the arrangement pitch at an axial intermediate position of the cooling passage of the intermediate portion cooling passage is smaller than the arrangement pitch at the same axial intermediate position of the first end portion cooling passage and the second end portion cooling passage.

20. The sealing member according to claim 16, wherein
in the intermediate portion cooling passage, the arrangement pitch at an axial upstream end of the cooling passages is the same as the arrangement pitch at an axial downstream end,
the first end portion cooling passage is formed so that the arrangement pitch at an axial upstream end of the cooling passages is smaller than the arrangement pitch at an axial upstream end of the intermediate portion cooling passages, and the arrangement pitch at the axial downstream end is larger than the arrangement pitch at the axial downstream end of the intermediate portion cooling passages, and
the second end portion cooling passage is formed so that the arrangement pitch at an axial upstream end of the cooling passages is larger than the arrangement pitch at an axial upstream end of the intermediate portion cooling passages, and the arrangement pitch at the axial downstream end is the same as the arrangement pitch at the axial downstream end of the intermediate portion cooling passages.

* * * * *